United States Patent
Durvasula et al.

(10) Patent No.: US 10,745,927 B2
(45) Date of Patent: Aug. 18, 2020

(54) METHOD AND APPARATUS FOR PROVIDING ORIENTATION RELATED ELECTRICAL SIGNALS FROM A ROBOTIC POOL CLEANER HAVING AN ORIENTATION SENSOR TO A REMOTE POWER SUPPLY VIA A TWO-WIRE CABLE

(71) Applicant: Aqua Products, Inc., Cedar Grove, NJ (US)

(72) Inventors: Kameshwar Durvasula, Garfield, NJ (US); Mark Sphilman, Fairlawn, NJ (US); Ethan Hanan, Teaneck, NJ (US)

(73) Assignee: AQUA PRODUCTS, INC., Cedar Grove, NJ (US)

( * ) Notice: Subject to any disclaimer, the term of this patent is extended or adjusted under 35 U.S.C. 154(b) by 310 days.

(21) Appl. No.: 15/567,542

(22) PCT Filed: Apr. 21, 2016

(86) PCT No.: PCT/US2016/028588
§ 371 (c)(1),
(2) Date: Oct. 18, 2017

(87) PCT Pub. No.: WO2016/172307
PCT Pub. Date: Oct. 27, 2016

(65) Prior Publication Data
US 2018/0148947 A1 May 31, 2018

Related U.S. Application Data

(60) Provisional application No. 62/150,477, filed on Apr. 21, 2015.

(51) Int. Cl.
*E04H 4/16* (2006.01)
*G05D 1/02* (2020.01)

(52) U.S. Cl.
CPC ........ *E04H 4/1672* (2013.01); *E04H 4/1654* (2013.01); *G05D 1/0276* (2013.01)

(58) Field of Classification Search
CPC .... E04H 4/1672; E04H 4/1654; G05D 1/0276
See application file for complete search history.

(56) References Cited

U.S. PATENT DOCUMENTS 5,435,031 A 7/1995 Minami et al.
6,099,658 A 8/2000 Porat
(Continued)

FOREIGN PATENT DOCUMENTS

EP 2749716 A1 7/2014

*Primary Examiner* — Abby Y Lin
*Assistant Examiner* — Renee LaRose
(74) *Attorney, Agent, or Firm* — Kilpatrick Townsend & Stockton LLP; Dean W. Russell

(57) ABSTRACT

A robotic pool cleaner for cleaning surfaces of a pool including a housing having an upper portion disposed over a base to define an interior chamber. The base includes a water inlet and the upper portion has at least one water discharge port for discharging filtered water. Rotatably-mounted supports support and guide the cleaner along a pool surface. A filter assembly filters water drawn through the water inlet. An electric motor mounted in the interior chamber is configured to move the cleaner on a pool surface. The electric motor receives power from a remote power source via a two-wire power cable. An electrical circuit having at least one orientation sensor is provided on-board the cleaner. The circuit is configured to provide an electrical signal to the remote power supply over the two-wire cable when the cleaner changes its orientation by a predetermined amount with respect to the pool surface.

10 Claims, 13 Drawing Sheets

(56) References Cited

U.S. PATENT DOCUMENTS

| | | |
|---|---|---|
| 8,661,595 B2 | 3/2014 | Bernini |
| 8,763,187 B2 * | 7/2014 | Mastio .................. E04H 4/1654 |
| | | 15/1.7 |
| 8,969,337 B2 | 3/2015 | Blumberg et al. |
| 2004/0260428 A1 | 12/2004 | Hadari |
| 2007/0028405 A1 | 2/2007 | Garti |
| 2007/0272273 A1 | 11/2007 | Adam |
| 2008/0078039 A1 | 4/2008 | Katz |
| 2009/0057238 A1 | 3/2009 | Garti |
| 2009/0255069 A1 | 10/2009 | Hui |
| 2009/0301522 A1 * | 12/2009 | Abehasera ............ E04H 4/1654 |
| | | 134/18 |
| 2010/0065482 A1 | 3/2010 | Sumonthee |
| 2011/0197932 A1 | 8/2011 | Mastio et al. |
| 2012/0092897 A1 * | 4/2012 | Hara ....................... H02J 9/005 |
| | | 363/16 |
| 2013/0110319 A1 * | 5/2013 | Michelon ............. E04H 4/1654 |
| | | 701/2 |
| 2013/0146106 A1 * | 6/2013 | Erlich ....................... B08B 9/08 |
| | | 134/34 |
| 2013/0269729 A1 | 10/2013 | Erlich et al. |
| 2014/0115796 A1 | 5/2014 | Sebor |
| 2014/0262997 A1 | 9/2014 | Renaud et al. |
| 2015/0067974 A1 | 3/2015 | Ben Dov et al. |

* cited by examiner

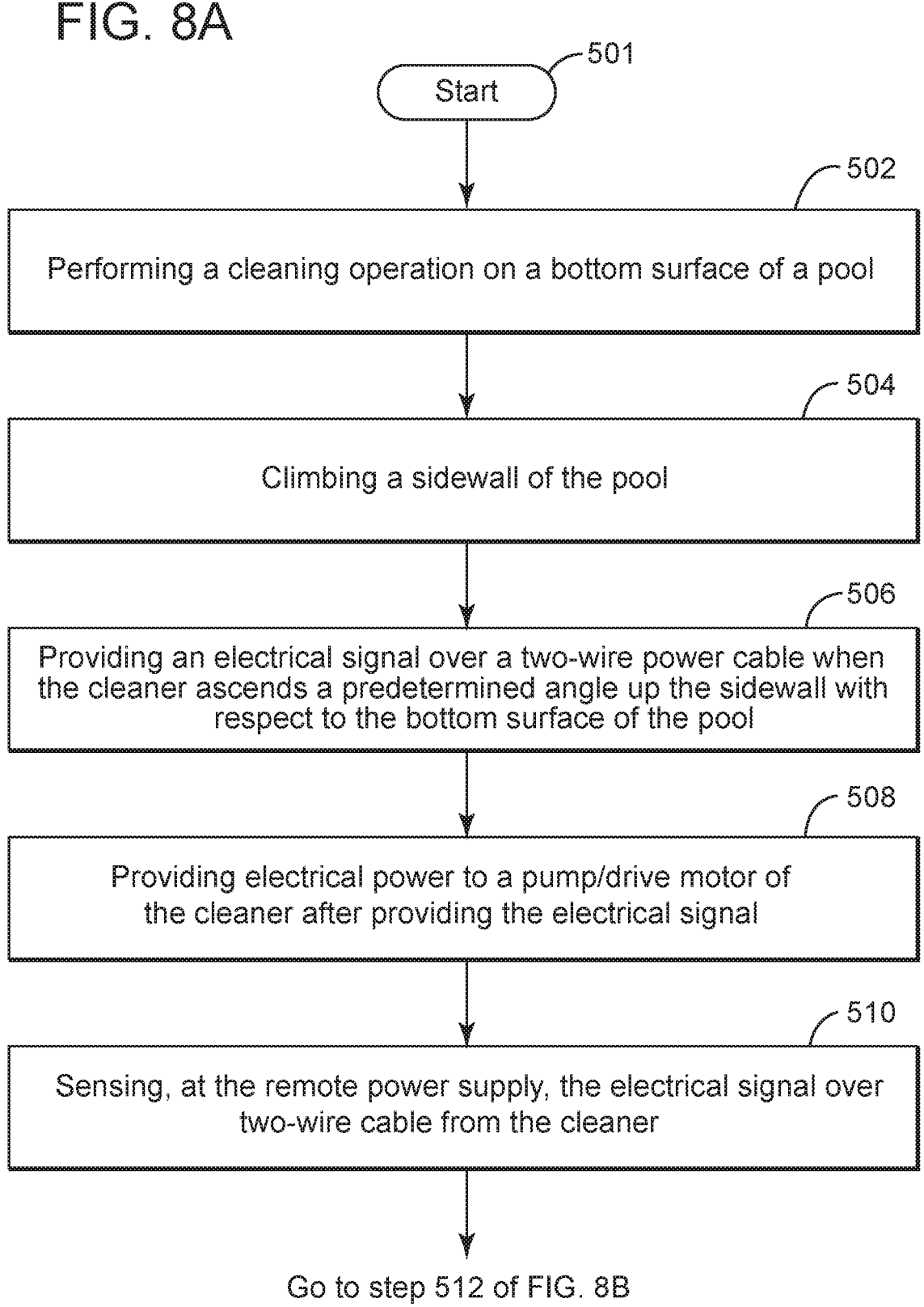

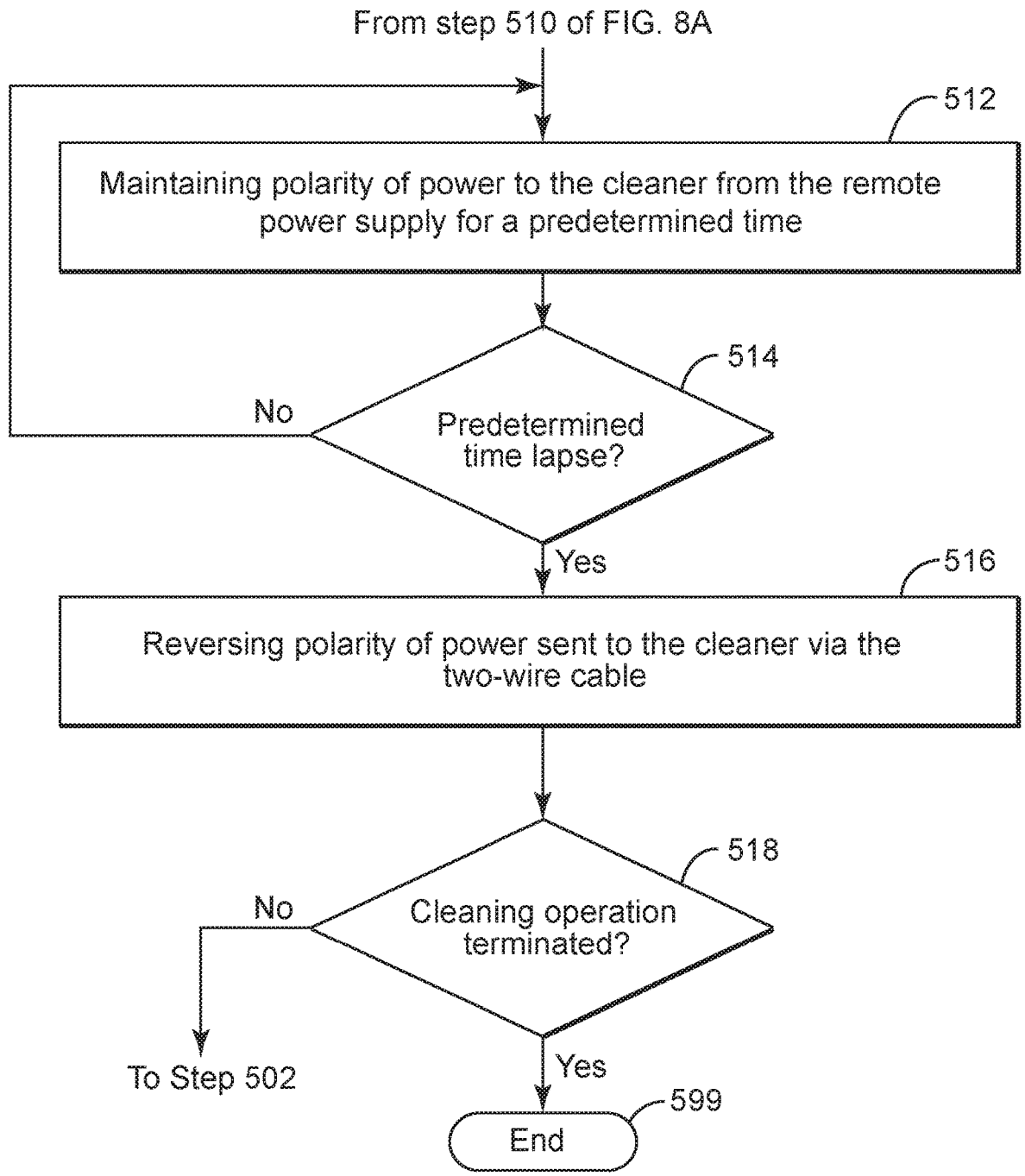

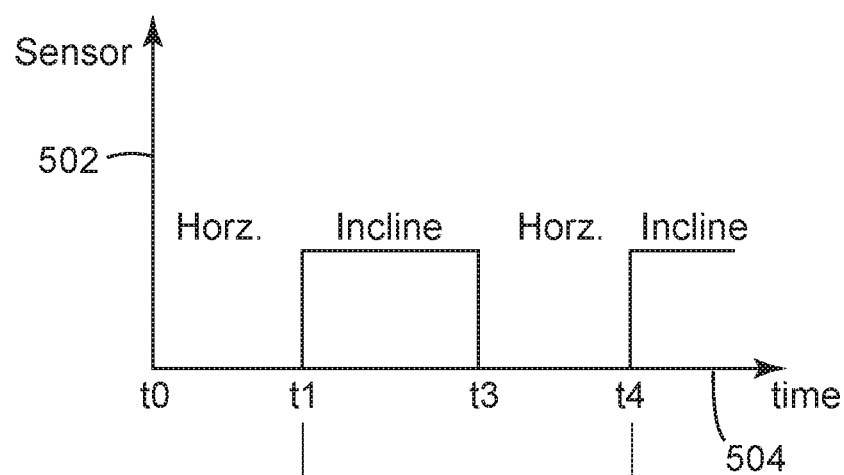
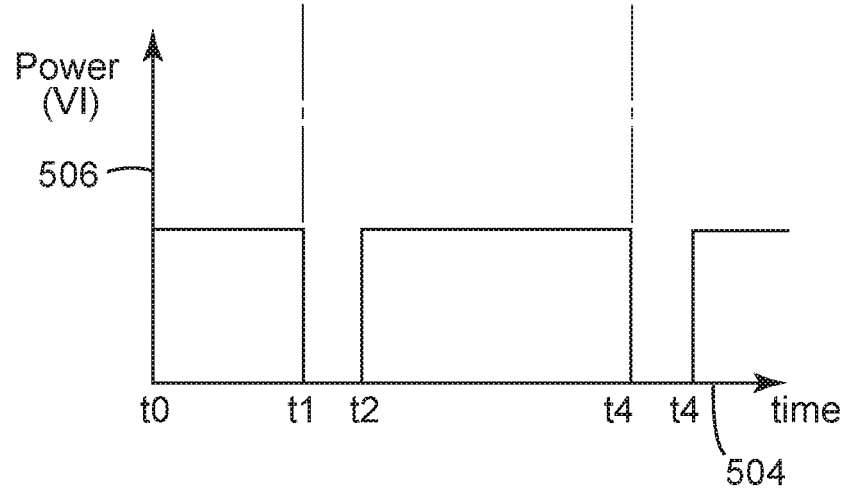

METHOD AND APPARATUS FOR PROVIDING ORIENTATION RELATED ELECTRICAL SIGNALS FROM A ROBOTIC POOL CLEANER HAVING AN ORIENTATION SENSOR TO A REMOTE POWER SUPPLY VIA A TWO-WIRE CABLE

CROSS-REFERENCE TO RELATED APPLICATION

This patent application claims the benefit under 35 U.S.C. § 371 to international application number PCT/US2016/028588, filed Apr. 21, 2016, which claims priority to U.S. provisional Application No. 62/150,477, filed Apr. 21, 2015, the contents of which are incorporated by reference herein in their entireties.

FIELD OF THE INVENTION

This invention relates to self-propelled robotic pool cleaners, and more specifically, to a method and apparatus for transmitting electronic control signals between the pool cleaner and a remote power supply.

BACKGROUND OF THE INVENTION

Self-propelled robotic pool cleaners include one or more drive motors to move or otherwise propel the cleaner over a surface of a pool being cleaned. The movement of the cleaner can be random or preferably is in accordance with a predetermined cleaning pattern. An electronic controller with memory can be provided on board the robotic pool cleaner for storing and executing cleaning programs, as well as other information to enable efficient cleaning of the pool.

The pool cleaner receives power from a remote power supply via a floating power cable having a pair of conductors. Typically, the power supply is configured to be portable so that an end-user can easily move the power supply from a remote storage area to a location in close proximity to the pool so that the cleaner is free to move about without undue drag exerted by the power cable. As a further convenience, many pool cleaner manufacturers provide a handcart which is configured to transport the cleaner, the cable and the power supply to and from the pool.

The remote power supply includes an internal power transformer and/or switching circuitry to enable operation from a conventional wall outlet or socket (e.g., 120 VAC (alternating current voltage) which is readily available at the end-user's residence or other facility. The transformer and/or switching circuitry converts the AC power from the conventional wall socket to a direct current voltage (VDC) output at a relatively lower voltage that is sufficient to operate the drive and/or pump motor(s) and control the pool cleaner during its cleaning operation.

The pool cleaner power cable is typically fabricated from two wire conductors having sufficient length to at least enable the cleaner to move over the entire bottom surface of the pool. The conductors have a protective covering that is typically fabricated from a foamed polymeric material that is buoyant and enables the cable to float as the submerged cleaner moves over the bottom and, optionally, the sidewall surfaces of the pool.

The power supply provides electrical power to drive one or more motors of the cleaner which propel the cleaner over the pool surfaces. For example, the one or more motors can rotate the wheels, roller brushes, and/or tracks of the cleaner via a transmission assembly. Alternatively, a pump motor having one or more propellers can be used to discharge a pressurized stream of filtered water in the form of a water jet that also propels the cleaner in a direction opposite the water jet. Some of the electrical power supplied by the power cable can also be directed to an on-board controller that includes a microcontroller, logic circuitry and/or programs to control the movement of the cleaner.

External or remote power supplies of the prior art have limited control functions over the pool cleaner, such as providing power on and off, reversing polarity to the drive motor/water pump, timers, and the like. Typically, the primary control of current pool cleaners has been facilitated by on-board microcontrollers that are programmed to control the cleaning operations in the pool.

Further, most robotic pool cleaners do not have their own power sources/supplies and the power cable is typically a two-wire cable, thereby limiting the extent of communications between the power supply and the pool cleaner. One option is to send communication signals over the two-wire cable to the cleaner's microcontroller in the form of pulsed power signals. However, such pulsed power signals can cause the drive motor(s), cleaner logic and support circuitry of the cleaner to intermittently lose power, as well as lose their ground reference in the cleaner.

A three-wire cable can be utilized to provide full-duplex communications in order to send communication signals without the power interruptions and ground reference losses; however, such three-conductor cables are significantly more expensive than two-wire power cables, and therefor are usually cost prohibitive to implement.

A robotic pool cleaner typically includes one or more cleaning programs stored in the memory of its on-board microcontroller. The microcontroller includes one or more sensors such as a tilt switch or accelerometer that sends a signal to the microcontroller to indicate when the cleaner is climbing a sidewall of the pool. The microcontroller can operate with internal or external timers or other sensors for ascending and descending the sidewall of the pool. Providing control operations on the cleaner adds complexity and can increase the costs to manufacture the cleaner.

It would therefore be desirable to transfer various cleaner control functions from on board the pool cleaner to the external or remote power supply. In particular, it would be desirable to provide communications over a two-wire cable between the power supply and the cleaner. It also would be desirable to enable control of the pool cleaner programming from the control circuitry of the remote power supply. As well, it would be desirable to establish communications between a remote power supply and a cleaner motor having circuitry with one or more orientation sensors. It would be also desirable to transfer greater control of the cleaning operations of the cleaner to the power supply in order to reduce programming costs associated with each cleaner. As well, it would be desirable to transfer greater control of cleaning operations across different models of the cleaner so that a single power supply model can be programmed to operate "universally" for various pool cleaner models.

SUMMARY OF THE INVENTION

The above disadvantages are avoided and/or solved by the embodiments of an apparatus and method of the present invention that are described below. In one embodiment, a method is provided for cleaning a surface of a pool with a robotic pool cleaner having an electric motor for moving the cleaner, the cleaner being electrically connected to a remotely located power supply via a two-wire electrical cable for providing power to the electric motor, the method comprises the steps of: receiving, at the motor, electrical power with a first polarity from the power supply via the two-wire electrical cable; performing a cleaning operation on a surface of the pool; changing orientation of the cleaner with respect to a surface of the pool thereunder; and providing an electrical signal to the remote power supply over the two-wire cable when the cleaner attains a predetermined change in orientation with respect to the surface of the pool.

In one aspect, the performing a cleaning operation step comprises the steps of: drawing water and debris into the cleaner via at least one inlet; filtering and retaining the debris in a filter assembly; and discharging filtered water back into the pool.

In another aspect, the step of providing the electrical signal comprises providing a pulsed signal to the remote power supply over the two-wire cable. In yet another aspect, the step of providing the electrical signal comprises providing a coded signal to the remote power supply over the two-wire cable. In still another aspect, the step of providing the electrical signal comprises providing a modulated signal to the remote power supply over the two-wire cable.

In one aspect, the step of providing the electrical signal comprises detecting, via an orientation sensor mounted in the cleaner, when the cleaner attains a predetermined change in inclination up a sidewall of the pool. In another aspect, the providing the electrical signal step further includes providing a timer delay circuit coupled to an output of the orientation sensor.

In one aspect, the method further comprises the step of receiving electrical power with the first polarity over the two-wire cable after the electrical signal is provided back to the remote power supply. In another aspect, the method further comprises the step of climbing a side wall of the pool. In yet another aspect, the method further comprises the step of receiving electrical power with reversed polarity over the two-wire electrical cable after a predetermined time period lapses, and reversing the direction of movement of the cleaner.

In one aspect, the method further comprises the step of detecting, at the remote power supply, the electrical signal over the two-wire cable.

In another embodiment, a robotic pool cleaner for cleaning a swimming pool comprises: a housing including an upper portion disposed over a base to define an interior chamber, the base including at least one water inlet and the upper portion having at least one water discharge port for discharging filtered water; rotatably-mounted supports supporting and guiding the cleaner along a pool surface; a filter assembly for filtering water drawn through the at least one water inlet; an electric motor mounted in the interior chamber and configured to move the cleaner on the pool surface, the electric motor receiving power from a remotely located power source via a two-wire power cable; and an electrical circuit on-board the cleaner and having at least one orientation sensor and configured to provide an electrical signal over the two-wire cable when the cleaner changes its orientation by a predetermined amount with respect to the pool surface.

In one aspect, the electrical circuit and the at least one orientation sensor are mounted in a housing of the electric motor. In another aspect, the electrical signal provided by the on-board electrical circuit over the two-wire cable comprises a pulsed signal. In yet another aspect, the electrical signal provided by the on-board electrical circuit over the two-wire cable comprises a coded signal. In still another aspect, the electrical signal provided by the on-board electrical circuit over the two-wire cable comprises a modulated signal.

In yet another embodiment, a system for cleaning a swimming pool having a bottom and a sidewall comprises: a robotic pool cleaner including a housing having an upper portion disposed over a base to define an interior chamber, the base including at least one water inlet and the upper portion having at least one water discharge port for discharging filtered water; rotatably-mounted supports supporting and guiding the cleaner along a surface of the pool; a filter assembly for filtering water drawn through the at least one water inlet; an electric motor mounted in the interior chamber and configured to move the cleaner on the pool surface, the electric motor receiving power and control signals from a remote power source via a two-wire power cable; and an electrical circuit having at least one orientation sensor and configured to provide an electrical signal over the two-wire cable when the cleaner attains a predetermined orientation with respect to the surface of the pool; the remote power supply comprises: an input adapter configured to receive AC power, detection circuitry for detecting the electrical signal over the two-wire power cable.

In one aspect, the remote power supply further comprises an AC/DC converter. In another aspect, the electrical signal detected by the controller comprises a pulsed signal. In yet another aspect, the electrical signal detected by the controller comprises a coded signal. In still another aspect, the electrical signal detected by the controller comprises a modulated signal.

BRIEF DESCRIPTION OF THE DRAWINGS

FIGS. 8A and 8B collectively depict a flow diagram of a method of providing power from a power supply to the cleaner of FIG. 1 and sending electrical signals from the cleaner with an orientation sensor to the power supply over a two-wire power cable during a cleaning operation; and FIGS. 9A and 9B are graphs illustrating a pulsed signal sent to the remote power supply via the power cable when the robotic pool cleaner ascends a sidewall of the pool;

Figure 1:
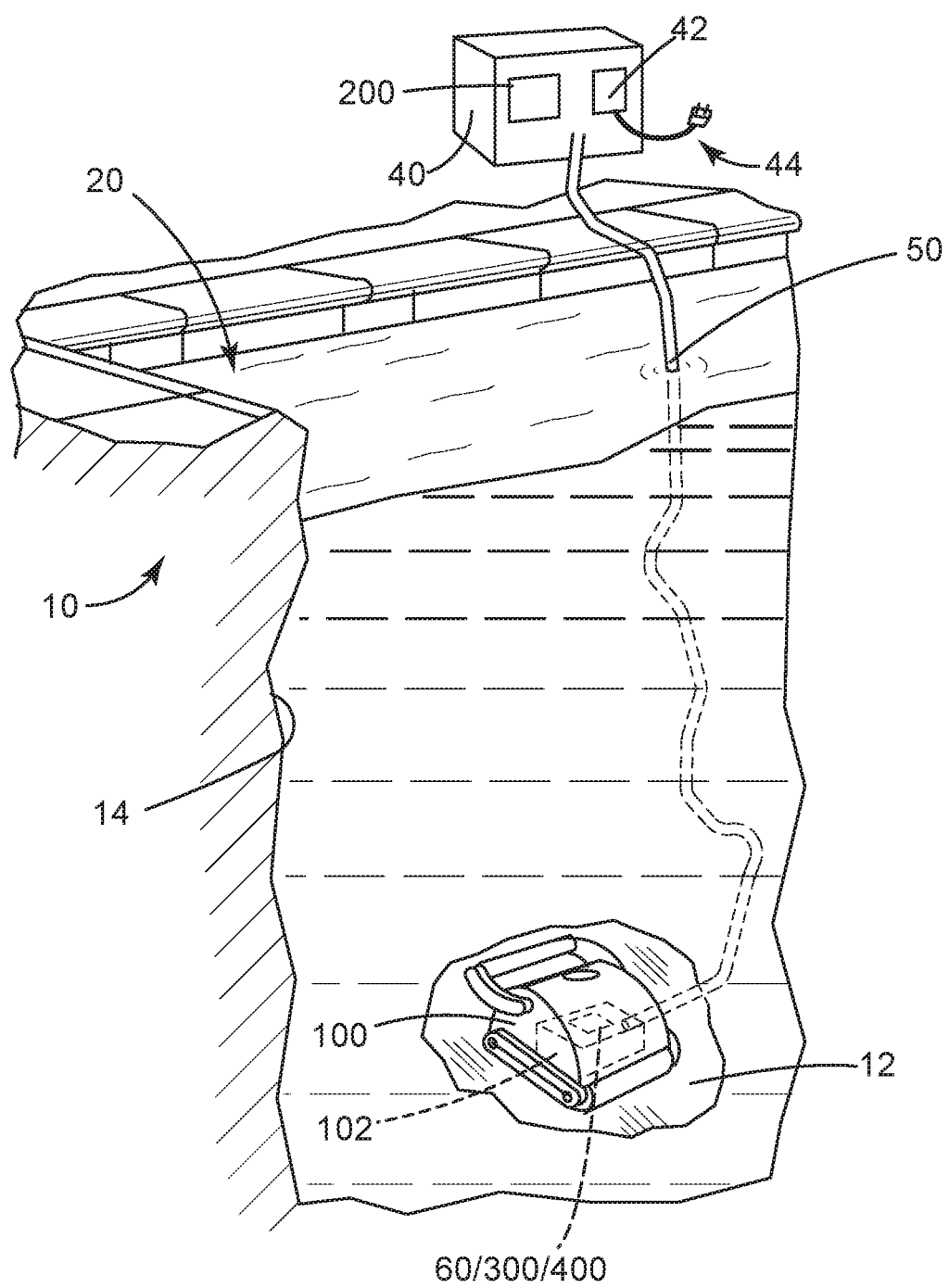
FIG. 1 is a perspective view of a portion of a swimming pool, partly in section, into which has been positioned an illustrative self-propelled robotic pool cleaner that is powered by and communicates electronically with a remotely located power supply via a power cable in accordance with the invention.

To further facilitate an understanding of the invention, the same reference numerals have been used, when appropriate, to designate the same or similar elements that are common to the figures. Further, unless otherwise indicated, the features shown in the figures are not drawn to scale, but are shown for illustrative purposes only.

DETAILED DESCRIPTION OF THE INVENTION

The invention is directed to a robotic pool cleaner including one or more orientation sensors (e.g. tilt sensors, accelerometers, gyroscopes and the like) and support circuitry for sending one or more signals over a two-wire power cable to a remotely located power supply to indicate that the cleaner is changing its orientation with respect to a surface beneath the cleaner, e.g., ascending a sidewall of the pool. The pool cleaner does not have its own source of power to drive the internal electric components such as, e.g., a pump motor and/or drive motor(s), electronic circuitry and/or the like. Rather, power to the cleaner is provided from the remote power supply via the two-wire power cable.

In particular, when the robotic pool cleaner changes its angular orientation with respect to the surface beneath the cleaner, one or more orientation sensors are activated and, along with accompanying support circuitry, send a pulsed signal (or series of pulsed signals, e.g., a coded signal) or a modulated signal over the cable to the remote power supply. In an embodiment where the cleaner generates a pulsed signal, it can be in the form of a power interruption (e.g., zero volts) occurring over the two-wire power cable for a predetermine period of time. Alternatively, the pulsed signal can be a predetermined drop in the voltage potential over the two-wire power cable for a predetermine period of time.

When the cleaner changes its orientation, for example, ascends the sidewall of the pool, i.e., the leading end of the cleaner climbs or rises to a predetermined angle with respect to the surface thereunder, and the orientation sensor is activated and generates the pulse. The power supply detects the drop in the voltage potential (e.g., power interruption) as a pulsed signal on the cable, and interprets the detected signal as indicating that the pool cleaner changed its orientation, e.g., ascending the sidewall of the swimming pool. Alternatively, in an embodiment where the cleaner generates a modulated signal (instead of a pulse), the power supply detects the modulated signal over the cable, and interprets the detected signal as indicating that the pool cleaner changed its orientation, e.g., ascending the sidewall of the swimming pool.

The power supply also includes electronic circuitry having a microcontroller and timers that reverse the polarity of the power to the cleaner over the two-wire power cable after a predetermined time period. The predetermined period of time for reversing polarity is set to sufficiently enable the pool cleaner to continue climbing and clean the sidewall of the pool after the pulse or modulated signal is detected by the power supply. Once the cleaner has reached the waterline along the sidewall of the pool and/or the predetermined time period has lapsed, the power supply reverses the polarity of power transmitted to the cleaner over the two-wire power cable. The reversal of the polarity of power to the cleaner reverses the rotational direction of the internal drive and/or pump motor(s) to thereby cause the cleaner to move in the reverse direction from which it previously ascended the sidewall. The cleaner descends from the waterline along the sidewall and to the bottom surface from which it moves to the opposing sidewall of the pool where the operation is repeated until the cleaning operation/program/cycle is completed/terminated. The wheels or other rotational support members of the cleaner guide or otherwise support and steer the cleaner as it moves along and cleans the surfaces of the pool.

Referring to FIG. 1, a sectional view of an in-ground swimming pool 10 is shown. The swimming pool includes a bottom surface 12 and generally vertical sidewalls 14 which form a container to hold the pool water 20. Although the pool 10 is described as an in-ground pool for purposes of illustration, such reference is not to be considered limiting. For example, the swimming pool can also be an above-ground pool, a tank or other water container that requires cleaning of its surfaces and filtering of the water. An illustrative self-propelled robotic pool cleaner 100 is shown positioned on the bottom surface 12 of the pool 10. The pool cleaner 100 has one or more electric drive motors which cause the cleaner to move over and clean the pool's bottom surface 12, and sidewalls 14. The pool cleaner 100 receives its electric power from a remotely located power supply 40 via an electric power cable 50 to which it is connected. The power cable 50 includes two wire conductors that are preferably encased in a foamed polymeric composition that renders the cable buoyant so that it will float on the water's surface.

The power supply 40 includes a transformer or switching circuitry 42 having a power input adaptor 44 suitable for connection to an alternating current (AC) power source, such as a conventional 120 VAC outlet receptacle (not shown) located proximate the pool 10 at an end-user's residence or other location. The transformer or switching circuitry 42 converts the AC power to a predetermined direct current (DC) voltage, such as 48 VDC. The power supply 40 further includes a controller 200 for controlling the DC power sent to the pool cleaner 100 via the cable 50.

Figure 2:
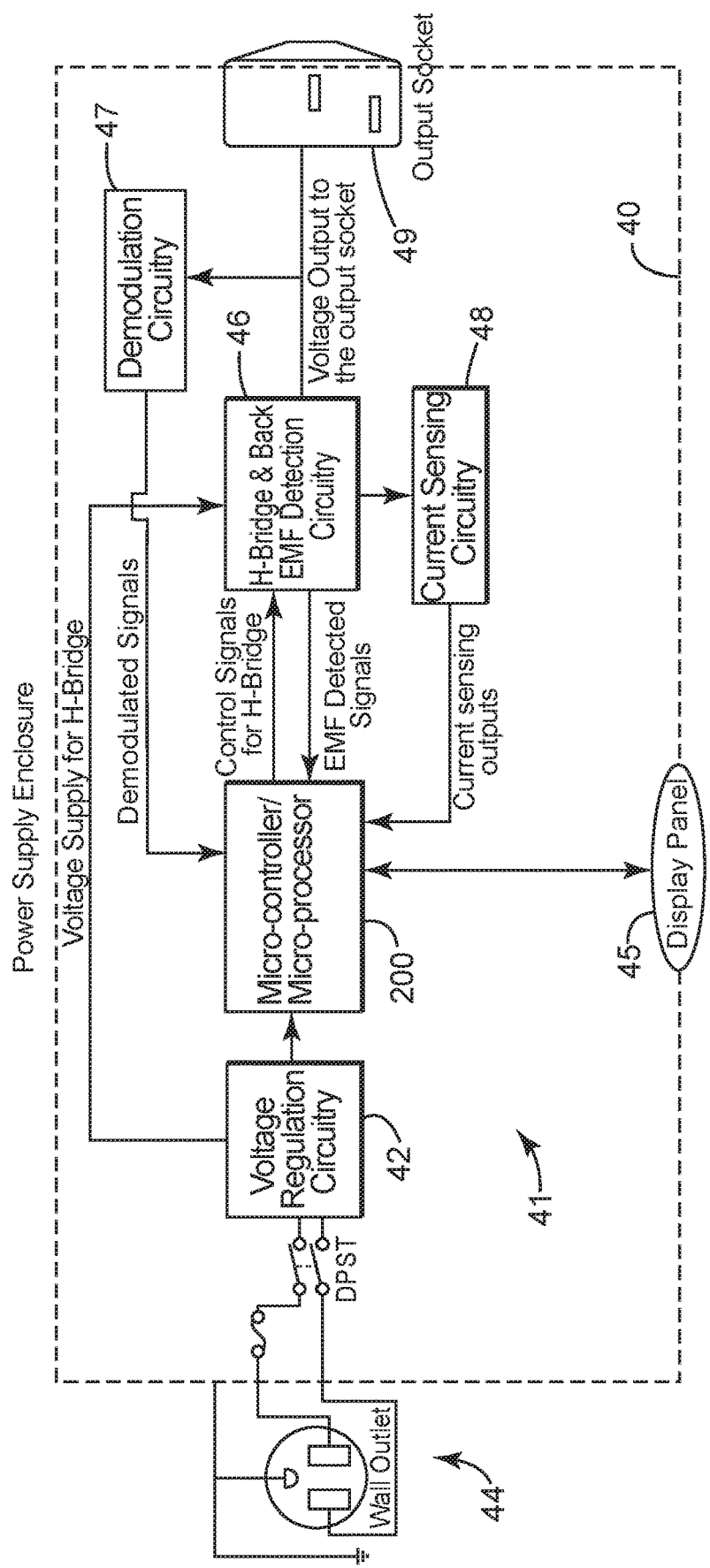
FIG. 2 is a block diagram of electronic circuitry of the remote power supply of FIG. 1 suitable for providing electric power to and sensing electrical signals from the robotic pool cleaner.

Referring now to FIG. 2, a block diagram of the electronic circuitry 41 of the remote power supply 40 is shown. The electronic circuitry provides electric power to and detects electrical signals from the robotic pool cleaner 100. As discussed herein, the remote power supply 40 provides power and control signals to the robotic cleaner 100 because the cleaner 100 does not have its own on-board source of power. The electronic circuitry 41 includes voltage regulation circuitry 42, a micro-controller/micro-processor circuitry 200, a control/display panel 45, cleaner motor control and speed detection (e.g., H-bridge and back EMF detection) circuitry 46, signal detection circuitry from the cleaner 100 such as signal modulation detection/demodulation circuitry 47 and/or current sensing circuitry 48, and a cable socket 49. The cable socket 49 provides a convenient electrical connection at the remote power supply 40 to selectively attach and detach a free end of the power cable 50 thereto.

The power input adaptor 44 includes a well-known power cord having a pair of conductors and a ground wire with a first end thereof attached to a plug for insertion into an AC power outlet socket. The conductors at the opposing end of the power cord are electrically connected to the voltage regulation circuitry 42 (e.g., transformer circuitry, rectifiers and the like) 42, for example, through a switch (e.g., DPST switch) and/or a fuse in a well-known manner.

The voltage regulator 42 converts AC to DC voltage and provides DC power (e.g., 5V) to the micro-controller 200, as well as DC power (e.g., 48V) to the cable socket 49 via the H-bridge and back EMF detection circuitry 46. The controller 200 controls the direction and rotational speed of the cleaner motor 102. In particular, the controller 200 sends control signals to the H-bridge to selectively change the polarity of electrical power provided to the cleaner motor 102 over the cable 50, and thereby control the rotational direction of the motor 102 (i.e., clockwise or counter-clockwise rotation). The controller 200 also receives back EMF detected signals from the back EMF detection circuitry 46 and operates in conjunction with other circuitry (not shown) and electrical parameters (e.g., supplied motor voltage and amount of current being consumed by the motor) to determine and selectively adjust the rotational speed (rpm) of the cleaner motor 102.

As shown in FIG. 2, the functional blocks 47 and 48 represent circuitry that facilitates (i) detecting a modulated signal being received over the cable 50 from the cleaner 100, or (ii) detecting a predetermined drop or absence of current flow being sent to the cleaner 100 over the two-wire cable 50. A modulated signal or a current drop occurring at the motor 102 is detected by the power supply 40 when the cleaner 100 changes its orientation a predetermined amount. The change in orientation can include, but is not limited to, a change from a horizontal orientation on the bottom surface of the pool to an inclined orientation as the cleaner climbs a sidewall of the pool. The change in inclination can occur as the cleaner 100 ascends a sidewall of the pool with its longitudinal axis aligned normal/substantially normal to, or at an angle to, or substantially lateral with respect to the bottom surface of the pool. A person of ordinary skill in the art will appreciate that circuitry can also be provided in the cleaner 100 to trigger a modulated signal or a current drop (e.g., pulse/coded signal) over the cable 50 when the cleaner contacts/impacts against a sidewall of the pool, thereby allowing the detection circuitry 47 or 48 to detect such occurrence. Other changes in orientation can include directional changes of travel along a surface of the pool, e.g., turning left or right with respect to a surface of the pool during a cleaning operation.

In one embodiment, the power supply 40 includes both the demodulation circuitry 47 and the current sensing circuitry 48 so that a single power supply model can be utilized across various models of the cleaner 100. Alternatively, the remote power supply 40 can include only the modulation detection/demodulation circuitry 47 or the current sensing circuitry 48 so as to correspond with the orientation signaling circuitry 60 (see, e.g., FIGS. 3 and 4) utilized by specific cleaner model(s).

Figure 4:
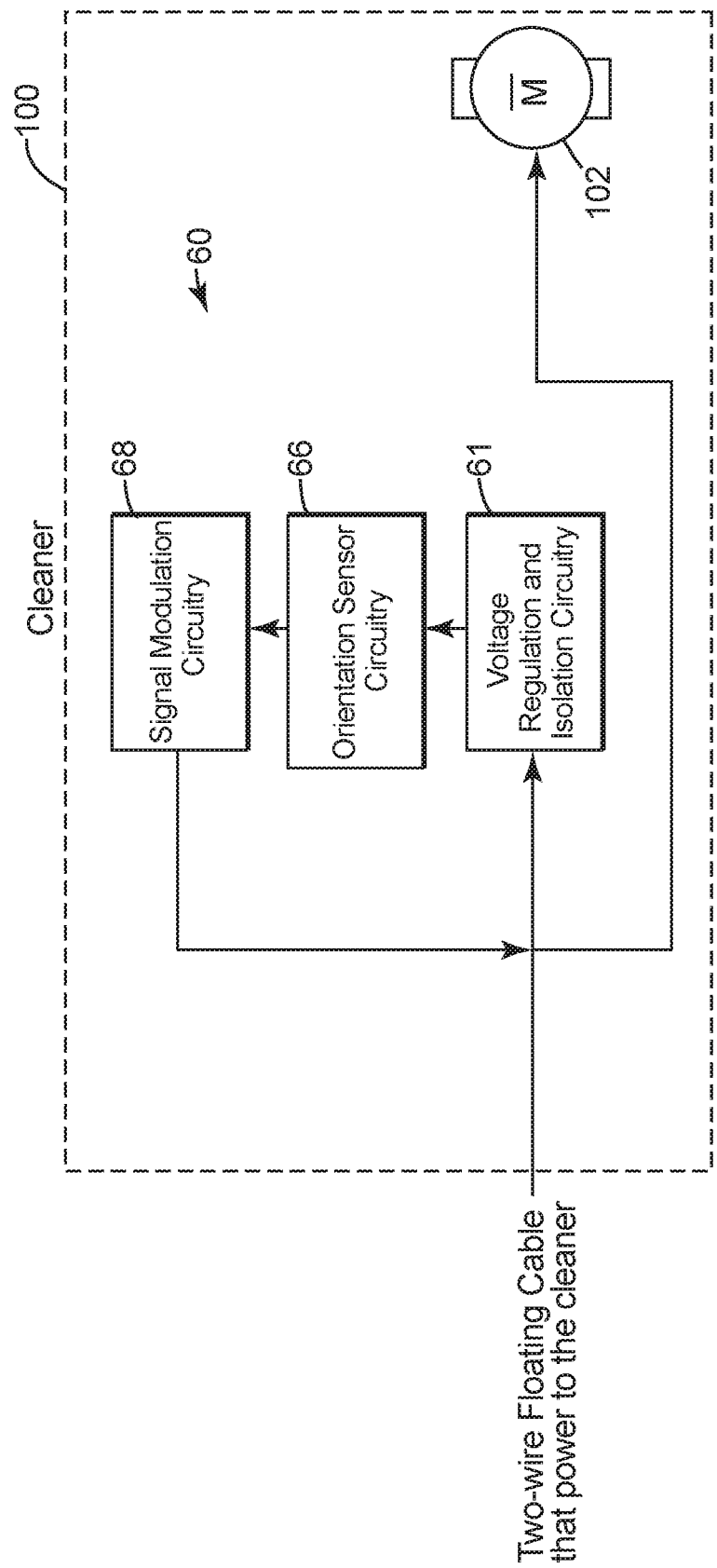
FIG. 4 is a block diagram of an embodiment of an electronic circuit with an orientation sensor for detecting the inclination of the robotic pool cleaner in accordance with the invention.
Figure 5:
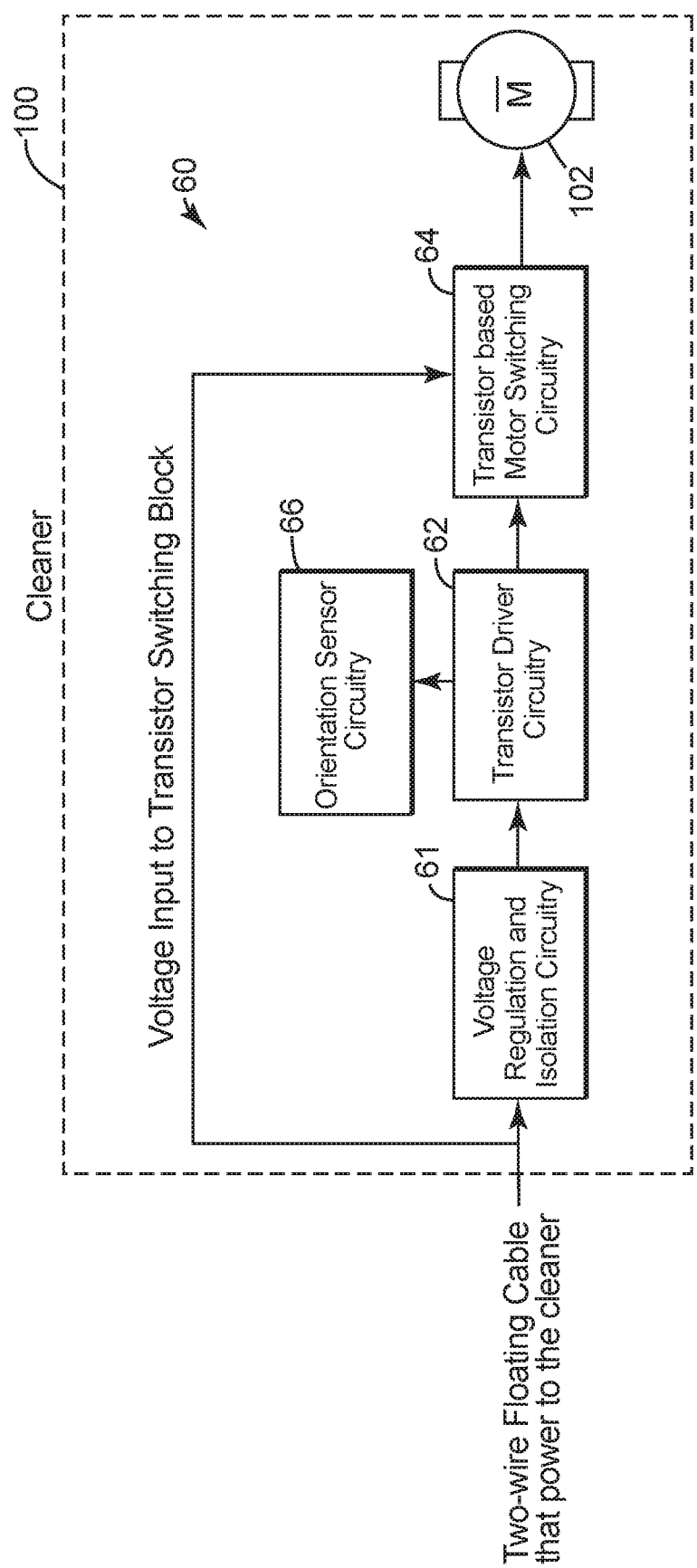
FIG. 5 is a block diagram of another embodiment of an electronic circuit with an orientation sensor for detecting the inclination of the robotic pool cleaner in accordance with the invention.

Based on the model/configuration of cleaner 100, the microcontroller 200 receives either a modulated signal from the cleaner over the two-wire cable 50, or the microcontroller 200 receives a low voltage signal which signifies a drop/loss in power (i.e., current) being sent to the cleaner 100 over the cable 50. If a modulated signal from the cleaner is detected by the circuitry 41, the demodulation circuitry 47 demodulates and transmits the demodulated signals to the controller 200 for further processing. Alternatively, if the orientation sensor 66 of the cleaner 100 initiates a pulse or otherwise causes a power drop/loss at the motor 102 because of a change in orientation, the current sensing circuitry 48 of the power supply 40 will detect the drop/loss in power being sent to the cleaner motor 102 and in response, send a corresponding signal to the microcontroller 200. The microcontroller 200 utilizes the signals received from the signal detection circuitry 47 (or circuitry 48) to further control the cleaning operations of the cleaner, e.g., maintain/reverse polarity to the motor to maintain/change the direction of travel, decrease/increase the speed of the cleaner, and the like. Further details of the operation of the power supply 40 and cleaner 100 are described below with respect to the high-level functional block diagrams of the cleaner as shown in FIGS. 4 and 5.

Figure 3:
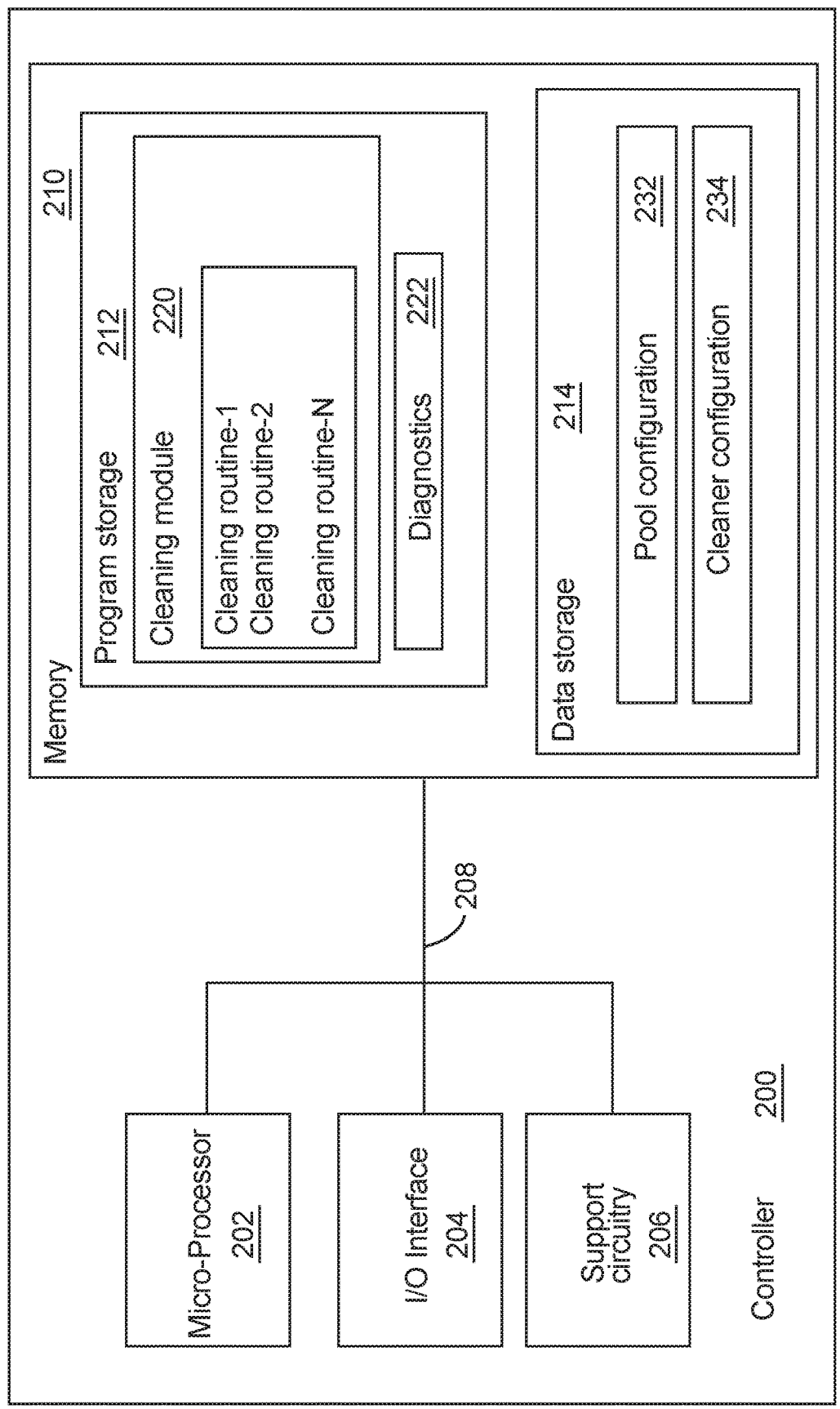
FIG. 3 is a block diagram of a controller suitable for use in the remote power supply of FIG. 1.

Referring to FIG. 3, a block diagram of a representative power supply microcontroller 200 is illustrated. The microcontroller 200 comprises at least one processor 202, as well as memory 210 for storing various control programs 212. The microprocessor 202 cooperates with support circuitry 206, such as communications circuits, timers, and cache memory, among other conventional support circuitry, to assist in executing such software routines as pool cleaning patterns, diagnostics, and the like, that are programmed or stored in the memory 210. The microcontroller 200 also comprises input/output (I/O) circuitry 204 that forms an interface between various functional elements communicating with the pool cleaner 100. For example, the microcontroller includes transmission and receiver lines for exchanging communication signals with the pool cleaner 100 via the two-wire power cable 50.

The microprocessor 202, memory 210, support circuitry 206 (e.g., registers, clocks/timers, and the like) and I/O circuitry 204 are generally embedded in a single integrated circuit and are all commonly connected to each other through one or more bus lines and/or conductors 208. One of ordinary skill in the art will appreciate that the functionality of the microcontroller can alternatively be provided using separate components including a microprocessor, memory devices and other support circuitry interconnected on a printed circuit board.

The memory 210 comprises program storage 212 and data storage 214 areas. The program storage 212 includes a cleaning module or programming 220 that can have one or more cleaning routines (e.g., cleaning routine 1 through N, where N is an integer greater than one. The program storage 212 can also include diagnostics programs 222 to run self-diagnostics and/or diagnostics on the pool cleaner 100, among other application programs. The data storage 214 includes content related to the configuration of the pool 232, such as, for example, its dimensions, type of pool surface, water type (e.g., salt or no salt), and the like, as well as content related to the configuration of the pool cleaner 234, such as power requirements, motor specifications, protocols, among other information. Any of the software program modules in the program storage 212 and data from the data storage 214 are transferred to specific memory locations as needed for execution by the microprocessor 202. It is contemplated that some of the process steps discussed herein as software processes may be implemented within hardware, for example, as circuitry that cooperates with the microcontroller 20 to perform various steps.

Referring to FIG. 4, a block diagram of an embodiment of an electronic circuit 60 with an orientation sensor 66 for detecting the inclination/orientation of the robotic pool cleaner 100 is illustratively shown. The circuitry of this first embodiment temporarily modulates the incoming power signal over the cable 50 which is detected by the demodulation circuitry 47 of the power supply 40. In particular, the electronic circuit 60 includes voltage regulation and isolation circuitry 61, orientation sensors/circuitry 66, and signal modulation circuitry 68. The second opposing end of the two-wire cable 50 is electrically connected to and provides power from the remote power supply 40 to the voltage regulation and isolation circuitry 61, which in turn provides DC power (e.g., 5V) to the orientation sensor circuitry 66, as well as DC power (e.g., 48V) directly to the motor 102 of the cleaner. The signal modulation circuitry 68 is operative when the orientation sensor circuitry 66 detects a predetermined amount of change in the orientation of the cleaner 100, for example, a predetermined angle or inclination (e.g., thirty degrees) with respect to the horizontal bottom surface of the pool.

In particular, when the orientation sensor circuitry 66 detects a predetermined amount of inclination or change in the orientation of the cleaner, the signal modulation circuitry 68 modulates the incoming power signal from remote power supply 50 over the two-wire cable 50 by any well-known modulation technique (e.g., PWM, AM, FM, and the like). A person of ordinary skill in the art will appreciate that the modulated signal also occurring at the motor 102 and voltage regulator circuitry 61 is negligible/inconsequential with respect to the operations of the cleaner. The modulated signal occurs for a predetermined time, for example, in the range of 0.01 microseconds to 0.5 seconds, although such times are not considered limiting. The demodulation circuitry 47 of FIG. 2 detects and demodulates the modulated signal from the cleaner 100, and forwards the demodulated signal to the microcontroller 200 for processing and further control of the operation of the cleaner 100.

Referring to FIG. 5, a block diagram of another embodiment of an electronic circuit 60 with an orientation sensor 66 for detecting the inclination of the robotic pool cleaner 100 is illustratively shown. The circuitry of this second embodiment generates a pulse or series of pulses over the cable 50 which are detected by the current sensing circuitry 48 of the power supply 40. In particular, the circuit 60 includes a voltage regulation and isolation circuit 61, transistor driver circuitry 62, transistor based motor switching circuitry 64 and orientation sensor circuitry 66. The conductors at the second opposing end of the two-wire cable 50 are connected and provide power to the voltage regulation and isolation circuitry 61, which in turn provides regulated DC power (e.g., 5V) to the transistor driver circuitry 62 and the inclination sensor circuitry 66. The second end of the cable 50 also provides DC power (e.g., 48V) directly to the transistor based motor switching circuitry 64 from the power supply 40 (e.g., voltage regulation circuitry 42 and H-bridge circuitry 46) via the cable 50.

The transistor driver circuitry 62 is switched on when the orientation sensor circuitry 66 detects a predetermined amount of change in the orientation of the cleaner 100, for example, a predetermined angle or vertical change with respect to the horizontal bottom surface of the pool. In particular, when the orientation sensor circuitry 66 detects a predetermined change in the vertical orientation of the cleaner, the transistor driver circuitry 62 is triggered and causes the motor switching circuitry 66 to prevent current flowing from the cable 50 to the motor 102 for a predetermined time. The drop or loss of power to the motor 102 can be a pulsed or coded signal having a duration of, for example, one millisecond to one second, although such times are not considered limiting). The short power interruption to the motor 102 by the switching circuitry 64 is considered negligible/inconsequential to the operation of the cleaner 100. Once the predetermined time lapses, the switching circuitry 64 returns to its normal pass-through state of operation to permit power from the power supply 40 and cable 50 to flow to the motor 102.

Figure 6:
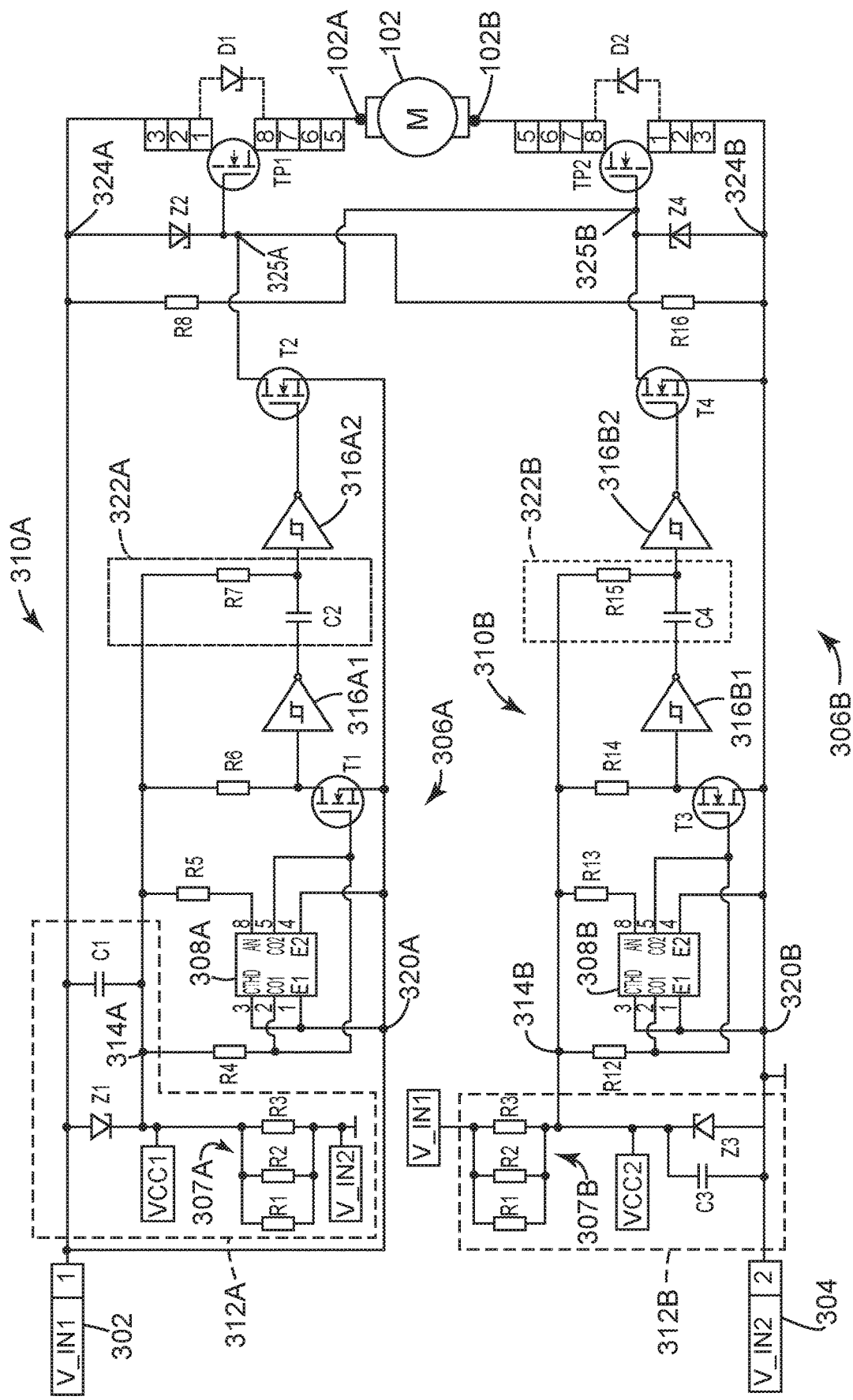
FIG. 6 is a schematic diagram of an embodiment of an electronic circuit in accordance with FIG. 5.
Figure 7:
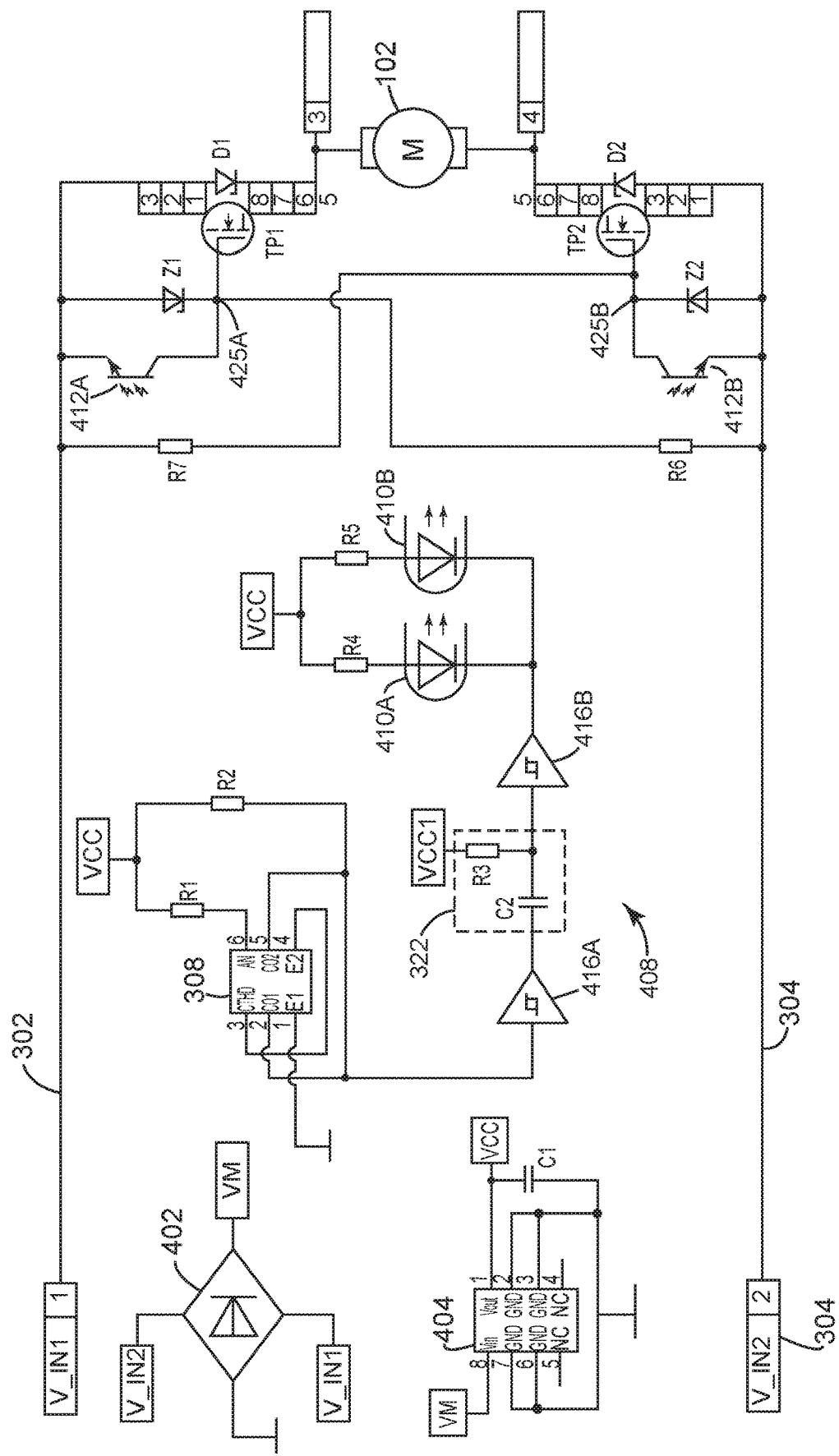
FIG. 7 is a schematic diagram of another embodiment of an electronic circuit in accordance with FIG. 5.

Referring to FIGS. 6 and 7, the circuit diagrams represent two illustrative embodiments that provide pulsed signals to the remote power supply in accordance with the block diagram of FIG. 5. The circuit diagrams of FIGS. 6 and 7 are not considered limiting in their configuration and/or methodology of conveying an electronic signal from a pool cleaner back to a remote power supply via a two-wire power cable when the cleaner changes it orientation a predetermined amount with respect to a surface of a pool.

In FIG. 6, a first embodiment of an illustrative circuit 300 for providing pulsed signals from a pool cleaner 100 to a remote power supply 40 is shown. The circuit 300 operates over a two-wire floating cable, e.g., cable 50 of FIG. 1, which includes a first conductor 302 and a second conductor 304. The circuit 300 is coupled between the two wire conductors Vin1 302 and Vin2 304 of the power cable 50 and the electric motor 102 of the cleaner 100. In particular, the circuit 300 includes a first circuit portion 306A having a first tilt sensor 308A and corresponding support circuitry 310A coupled between the first conductor Vin1 302 and the electric motor 102, e.g., at 102A of the commutator of the motor 102. Similarly, the circuit 300 includes a second circuit portion 306B having a second tilt sensor 308B and corresponding support circuitry 310B coupled between the second conductor Vin2 304 and the electric motor 102 (e.g., at 102B of the commutator of the motor 102).

The tilt sensors 308A and 308B can be two-dimensional (forward, backward, left, right directional) tilt sensors (e.g., an RPI-1031 tilt sensor). Each tilt sensor 308 includes an internal light emitting diode (LED) of which the anode lead/pin (AN) and cathode lead (CTHD) are illustratively shown in the drawing, a first internal transistor of which the first collector lead (C01) and the first emitter lead (E1) are shown in the drawing, and a second internal transistor of which the second collector lead (C02) and second emitter lead (E2) are illustratively shown in the drawing. The light from the internal LED is used to forward bias the gates of the internal transistors so that they conduct. A person of ordinary skill in the art will appreciate that the two-dimensional tilt sensor is not to be considered limiting. For example, a three-dimensional tilt sensor or a two- or three-dimensional accelerometer can alternatively be implemented.

In general, the first circuit portion 306A of the circuit 300 includes a first voltage regulator 312A that has a pair of input connections provided between the first conductor Vin1 302 and the second conductor Vin2 304, and a signal output voltage (VCC1) provided at node 314A, which in turn is connected to the first tilt sensor 308A. The tilt sensor 308A is coupled to a first driving transistor T1, which in turn drives a pair of inverter logic gates 316A1 and 316A2, which in turn drive a second driving transistor T2, which drives a first (e.g., power) transistor (switch) TP1, which in turn controls the current flow to the commutator 102A of the electric motor 102. The driving/power transistors T1, T2 and TP1 are preferably N-channel field effect transistors, although such transistor types are not considered limiting. The inverters 316A1 and 316A2 are preferably Schmidt triggers, although such devices are not considered limiting. For example, any logic gate with input-to-output inverter logic, or other device that can provide the required high and low input/output voltages to control the on/off state of the transistors T2 and TP1 can be implemented.

The first voltage regulator 312A comprises a first Zener diode Z1, a capacitor C1, and a power divider circuit 307A. In particular, the first conductor Vin1 302 is connected to the anode of Zener diode Z1 of which its cathode is connected to the second conductor 304 via the power divider circuit 307A. The power divider circuit 307A is illustratively formed by resistors R1, R2 and R3 coupled in parallel between the cathode of Z1 and a ground reference of the cleaner (e.g., the motor housing), which is also tied to the second conductor Vin2 304. The power divider circuit 307A serves as a current limiter for diode Z1. The capacitor C1 is connected in parallel to the Zener diode Z1 between the first conductor 302 and node 314A. The capacitor C1 is normally charged when Zener diode Z1 is at its breakdown voltage (e.g., 5 volts) and is used to help maintain a constant voltage between VCC1 and the first conductor 302.

The Zener diode Z1 has its anode connected to the first conductor Vin1 302 and its cathode connected to node 314A. The Zener diode Z1 defines a reference voltage VCC1 (e.g., 5 volts during Zener breakdown conditions) at node 314A. The first tilt sensor 308A includes an internal diode having its anode AN connected via a current limiting resistor R5 to the first voltage regulator 312A at node 314A. The cathode CTHD of the internal diode of the tilt sensor 308A is connected at node 320A to the first conductor Vin1 302, as well as the source/bulk of transistor T1. The gate of driving transistor T1 is coupled to the voltage regulator 312A at node 314A via pull-up resistor R4. The drain of transistor T1 is connected to the cathode of diode Z1 (i.e., VCC1) at node 314A via a pull-up resistor R6. The emitters E1 and E2 of the first and second internal transistors of the first tilt sensor 308A are also connected to the first conductor Vin1 302 and the source/bulk of transistor T1 at node 320A. The first and second cathodes C01 and C02 of the respective first and second internal transistors of the first tilt sensor 308A are connected to VCC1 at node 314A via pull-up resistor R4, as well as to the gate of the first driver transistor T1.

The drain of the first driver transistor T1 is further connected to the input gate of a first inverter 316A1 of which the output is connected to the input of a second inverter 316A2 via a capacitor C2. The input of the second inverter 316A2 is also coupled to VCC1 (at node 314A) via a pull-up resistor R7. The output of the second inverter 316A2 is connected to the gate of the second driver transistor T2, of which the source and bulk are connected to the first conductor Vin1 302, e.g., at node 320A, and its drain is connected to the gate of the power transistor TP1. The source and bulk of the transistor TP1 are connected to the first conductor Vin1 302 at node 324A, and its drain is connected at 102A to the commutator of the electric motor 102. The power transistor TP1 includes an internal diode (D1 drawn in phantom) that has its anode and cathode respectfully formed between the source and drain of transistor TP1. A Zener diode Z2 has its anode connected to the first conductor Vin1 302 at node 324A, and its cathode connected at node 325A to the second conductor 304 via a current limiter resistor R16. The cathode of Zener diode Z2 is also connected to the gate of transistor TP1 at node 325A.

Referring now to the second circuit portion 316B of the present circuit, the arrangement of components is similar to the first circuit portion 316A, except that the components that were connected to the first conductor Vin1 are connected to the second conductor Vin2 304 of the cable 40 and vice versa. As well, the gate of the second power transistor (switch) TP2 is connected to the cathode of a Zener diode Z4 of which the anode is connected to the second conductor Vin2 304. The cathode of Zener diode Z4 is also connected to the first conductor Vin1 302 via a current limiter resistor R8 of the first circuit portion 306A.

In particular, second circuit portion 306B includes a tilt sensor 308B and corresponding support circuitry 310B coupled between the second conductor Vin2 304 and the commutator 102B of the electric motor 102. As noted above, the tilt sensor 308B includes an internal diode of which the anode lead/pin (AN) and cathode lead (CTHD) are illustratively shown in the drawing, a first internal transistor of which the first collector lead (C01) and the first emitter lead (E1) are shown in the drawing, and a second internal transistor of which the second collector lead (C02) and second emitter lead (E2) are illustratively shown in the drawing.

In general, the second circuit portion 306B of the circuit 300 includes a second voltage regulator 312B that has a pair of input connections provided between the second conductor Vin2 304 and the first conductor Vin1 302, and a signal output voltage (VCC2) provided at node 314B, which in turn is connected to the second tilt sensor 308B. The tilt sensor 308B is coupled to a third driving transistor T3, which in turn drives a pair of inverter logic gates 316B1 and 316B2, which in turn drive a fourth driving transistor T4, which drives a second (e.g., power) transistor (switch) TP2, which in turn controls the current flow to the commutator 102B of the electric motor 102. The driving/power transistors T3, T4 and TP2 are preferably N-channel field effect transistors, although such transistor types are not considered limiting. The inverters 316B1 and 316B2 are preferably Schmidt triggers, although such devices are not considered limiting. For example, any logic gate with input-to-output inverter logic, or other device that can provide the required high and low input/output voltages to control the on/off state of the transistors T4 and TP2 can be implemented.

The second voltage regulator 312B comprises a Zener diode Z3, a capacitor C3, and a power divider circuit 307B. In particular, the second conductor Vin2 304 is connected to the anode of Zener diode Z3 of which its cathode is connected to the first conductor Vin1 302 via the power divider circuit 307B. The power divider circuit 307B is illustratively formed by resistors R9, R10 and R11 coupled in parallel between the cathode of Z3 and the first conductor Vin1 302. The power divider circuit 307B serves as a current limiter for diode Z1. The capacitor C3 is connected parallel to the Zener diode Z1 between the second conductor 304 and node 314B. The capacitor C3 is normally charged when Zener diode Z3 is at its breakdown voltage (e.g., 5 volts) and is used to help maintain a constant voltage between VCC2 and the second conductor 304.

The Zener diode Z3 has its anode connected to the second conductor Vin2 304 and its cathode connected to node 314B. The Zener diode Z3 defines a reference voltage VCC2 (e.g., 5 volts during Zener breakdown conditions) at node 314B. The second tilt sensor 308B includes an internal diode having its anode AN connected via a current limiting resistor R13 to the second voltage regulator 312B at node 314B. The cathode CTHD of the internal diode of the tilt sensor 308B is connected at node 320B to the second conductor Vin2 304, as well as the source/bulk of transistor T3. The gate of driving transistor T3 is coupled to the voltage regulator 312B at node 314B via pull-up resistor R12. The drain of transistor T3 is connected to the cathode of diode Z3 (i.e., VCC2) at node 314B via a pull-up resistor R14. The emitters E1 and E2 of the first and second internal transistors of the second tilt sensor 308B are also connected to the second conductor Vin2 304 and the source/bulk of transistor T3 at node 320B. The first and second cathodes C01 and C02 of the respective first and second internal transistors of the second tilt sensor 308B are connected to VCC2 at node 314B via pull-up resistor R12, as well as to the gate of the first driver transistor T3.

The drain of the first driver transistor T3 is further connected to the input gate of a first inverter 316B1 of which the output is connected to the input of a second inverter 316B2 via a capacitor C4. The input of the second inverter 316B2 is also coupled to VCC2 (at node 314B) via a pull-up resistor R15. The output of the second inverter 316B2 is connected to the gate of the second driver transistor T4, of which the source and bulk are connected to the second conductor Vin2 304, e.g., at node 320B, and its drain is connected to the gate of the power transistor TP2. The source and bulk of the transistor TP2 are connected to the second conductor Vin2 304 at node 324B, and its drain is connected at 102B to the commutator of the electric motor 102. The power transistor TP2 includes an internal diode (D2 drawn in phantom) that has its anode and cathode respectfully formed between the source and drain of transistor TP2. A Zener diode Z4 has its anode connected to the second conductor Vin2 304 at node 324B, and its cathode connected at node 325B to the first conductor 302 via a current limiter resistor R8. The cathode of Zener diode Z4 is also connected to the gate of transistor TP2 at node 325B.

During normal operation the cleaner is moving on the substantially planar bottom surface of the pool as shown in FIG. 1. Referring to FIG. 6, one of the conductors, e.g., the first conductor Vin1 302 is illustratively at a positive DC potential, e.g., 30 VDC, and the second conductor Vin2 304 is at a lower potential, e.g., ground. At this time, the tilt sensor 308A is off. In particular, the internal transistors do not conduct because the light from the internal LED is prevented (blocked) from illuminating and biasing the bases or gates of the internal transistors. Thus, the driver transistors T1 and T2 are also off and act as an open circuit. Since the tilt sensor 308A and trigger circuitry 310A is off, the first voltage regulator 312A causes VCC1 to go to a low potential, i.e., approximately at ground potential, since the Zener diode Z1 conducts as a normal diode below its breakdown characteristics. The current from the first conductor Vin1 302 flows to node 324A through Zener diode Z2 to ground via R16 of the second circuit portion 306B. The current through diode Z2 biases the gate of power transistor TP1 so that its internal diode D1 formed between the source and drain of transistor TP1 conducts and passes the current from the first conductor 302 to the commutator the electric motor 102.

Referring now to the second circuit portion 306B of the circuit 300, during the normal operation along the bottom surface 12 of the pool 10, as the first conductor 302 is at a higher potential (e.g., 30 VDC) than the second conductor Vin2 304 (e.g., ground), Zener diode Z3 reaches its breakdown voltage (e.g., 5 volts) such that VCC2 goes to a high potential (e.g., 5 VDC) and the driver transistor T3 is biased closed (i.e., shorted to ground) due to pull-up resistor R12. This in turn provides a low input voltage to the first inverter 316B1 that inverts its output voltage to a high state which in turn charges capacitor C4. The second inverter 316B2 also produces a low output at the gate of transistor T4, which causes it to act as an open circuit between the second conductor 304 (i.e., ground) and the second power transistor TP2. At this time, the Zener diode Z4 has a high potential (e.g., 12 Volts) which biases the power transistor TP2 and causes the current to flow through the drain and source of transistor TP2 to ground (i.e., the second conductor 304). A high resistance value of R8 (e.g., 100K) limits current flow to the first conductor 302 and further directs the current from Z4 into the gate of the second power transistor TP2. As such, the current flows through the commutator of the electric motor 102 to the second conductor 304 (i.e., ground). Thus, the circuit 300 provides power from the first conductor 302, through the motor 102 and returns through the second conductor 304 to cause the motor to rotate in a first direction (e.g., counter-clockwise).

When the power supply 40 reverses the polarity to the motor 102, the first conductor 302 goes to a low state (ground) and the second conductor 304 goes to a high potential (e.g., 30 VDC) to cause the motor 102 to rotate in the opposite direction (e.g., clockwise). Under reverse polarity conditions, the roles of the first and second portions 306A and 306B are also reversed such that second circuit portion 306B now operates in the same manner as previously described with regard to the first circuit portion 306A, and the first circuit portion 306A now operates in a similar manner as previously described with regard to the second circuit portion 306B.

The operation of the circuit 300 while the cleaner 100 is climbing a sidewall 14 of the pool 10 will now be described. For purposes of describing the invention, the first conductor 302 is illustratively at a high voltage (e.g., 30 VDC) and the second conductor 304 is at ground potential. The electric motor 102 moves the cleaner 100 along the bottom surface 12 of the pool 10 to an opposing sidewall 14, where it begins to ascend the sidewall 14. Once the front or leading end of the cleaner is displaced a predetermined angle, e.g., 30-60 degrees, the second tilt switch 308B activates and causes the gate of the driver transistor T3 of the second circuit portion 306B to go to a low state. As described above, the gate transistor T3 is normally biased from VCC2 through resistor R12, and the input to the first inverter 316B1 is low (ground). When the tilt sensor 308B is activated, the internal LED diode (designated by leads AN and CTHD) of the second tilt sensor 308B illuminates the bases/gates of the internal transistors so that current flows from the VCC2 to ground 304 via resistor R12 and the source of T3. Because the collectors C01 and C02 of the tilt sensor 308B are at a low state, the gate of transistor T3 is also at a low state (ground) to thereby turn transistor T3 off. This in turn causes a high condition at the input of the first inverter 316B1 because of the voltage drop of VCC2 (e.g., the 5V supply) across resistor R14 and the output of inverter 316B1 to go to a low state. As well, the input of the second inverter briefly goes to a low state causing its output to go high to bias and close the transistor T4. The timer delay circuit 322B which is illustratively formed by the previously charged capacitor C4 and resistor R15 (i.e., RC circuit) will discharge current so that it flows to the low input of the second inverter 316B2 over a predetermined time period. The current flow from capacitor C4 causes a high input at the second inverter 316B2, which in turn causes the gate of transistor T4 to go to a low state and turn off (open) the transistor T4. The power supply senses the closing and opening of the transistor T4 from the pulsed signal, i.e., the current discharge from the RC circuit 322B on the second conductor 304, as described below in further detail with respect to method 500.

As noted above, Zener diode Z4 has a high potential (e.g., 12 Volts) which biases the second power driver TP2 and causes the current to flow through the drain and source of power transistor TP2 to ground (i.e., the second conductor 304). The high resistance value of R8 (e.g., 100K) limits current flow to the first conductor 302 and further forces the current from Z4 through the gate of the second power transistor TP2. As such, the current flows through the motor 102 to the second conductor 304 (i.e., ground). Thus, the circuit 300 provides power from the second conductor 304, through the motor 102 and through the first conductor 302 to cause the motor to rotate in a second direction (e.g., counter-clockwise).

Referring now to FIGS. 8A and 8B, a method 500 for sending a pulsed signal from a pool cleaner having the tilt sensor circuit 300 to the power supply 40 via the two-wire power cable 50 is illustratively shown. For purposes of better understanding the invention, the method 500 is discussed with reference to FIGS. 6 and 9A and 9B, which illustrate an electrical pulse signal being generated when the orientation of the cleaner changes a predetermined amount with respect to the surface beneath the cleaner. A person or ordinary skill will appreciate that the electrical signal being generated and provided to the remote power supply in the various steps of method 500 can alternatively be a series or pulses, e.g., coded signals, or a modulated signal that the remote power supply 40 can detect.

Referring to FIG. 9A, the ordinate 602 represents the positional state of the tilt sensor and the abscissa 604 denotes time. Referring to the graphic depiction of FIG. 9B, the ordinate 506 represents power (VI) being sent to the cleaner 100 by the power supply 40 via the two-wire power cable 50, and the abscissa 604 denotes time. The times shown in FIGS. 9A and 6B during operation of the cleaner along the bottom of the pool and the sidewall of the pool are not to scale and are for illustrative purposes only, as cleaning operations typically have greater times spent on the bottom surface of the pool than on the side walls of the pool.

The method 500 starts at step 501 and proceeds to step 502, where the cleaner 100 is performing a cleaning operation on a bottom surface 12 of the pool 10. Referring now to FIG. 9A, during operation when the cleaner 100 is on the bottom 12 or substantially horizontal planar surface of the pool 10, the tilt sensors 308 are off. Continuing with the polarity arrangement illustratively described above with respect to FIG. 6 (Vin1 302 is positive and Vin2 304 is negative), when the cleaner reaches and initiates the climbing of the sidewall 14 of the pool 10 and the leading edge of the cleaner 100 is at a predetermined angle with respect to the bottom surface 12, the tilt sensor 308B is activated.

At step 504, the cleaner approaches and begins to climb a sidewall of the pool 10. Referring to FIGS. 9A and 9B together from left to right, at time t0 to time t1, the cleaner 100 is moving horizontally along the bottom surface 12 of the pool 10 and DC power over the two-wire cable 50 from the power supply 40 is constant until just prior to time t1, when it reaches and begins to climb a sidewall 14 of the pool.

Referring to FIG. 6, during the time period of t041, the tilt sensors 308A and 308B are off, driver transistors T1, T2 and T4 are open, transistor T3 is closed to enable charging of capacitor C4, Zener diode Z4 provides a high voltage at node 325B to bias transistor TP2, and current from the first conductor 302 flows through the internal diode D1 of the transistor TP1, through the commutator of motor 102, through the drain and source of transistor TP2 and back to the power supply 40 via the second conductor 304.

At step 506, the cleaner generates an electrical (e.g., pulsed, coded or modulated) signal over the two-wire cable 25 when the cleaner illustratively ascends the sidewall a predetermined angle with respect to the bottom surface of the pool. In particular, referring to FIGS. 6, 9A and 9B, at time t1, the cleaner 100 climbs to a predetermined angle with respect to the bottom surface 12 of the pool and the tilt sensors 308 turn on. Referring to the schematic diagram of FIG. 6, when the tilt sensors 308A and 308B are activated, the third driver transistor T3 is open so that the input to the first inverter 316B1 is high and its output is low, which means the input of the second inverter 316B2 is low. The time that the timer delay circuit 322B discharges the current to the input of the second inverter 316B2 is characterized by the voltage drop shown between times t1 and t2. Although the pulse is illustratively shown as being a vertical drop in power, a person of ordinary skill in the art will appreciate that where the timer delay circuit is formed by an RC circuit, the discharge is actually an exponential decay based on the RC time constant. In particular, the time required to discharge a capacitor through a resistor is in accordance with the equation: $V(t)=V_o(e-t/r)$; and the time required to charge a capacitor through a resistor is in accordance with the equation $V(t)=V_o(1-e-t/r)$, where t=time (seconds) and r=RC values of the RC circuit 322 as measured in ohms and farads.

At step 508, after the capacitor C4 has discharged, uninterrupted DC power is provided to the electrical pump and/or drive motor 102 of the cleaner 100. Referring again to FIG. 6, once the capacitor C4 has discharged its current, the output of the second inverting gate 316B2 returns to a low state and transistor T4 is open. With transistor T4 open, Zener diode Z4 biases the gate of transistor TP2 and power to the motor 102 is provided from the first conductor 302 through the internal diode D1 of power transistor TP1, through the motor (e.g., commutator), through the drain and source of transistor TP2, and back to the power supply 40 via the second conductor 304.

At step 510, the power supply 40 senses the electrical (pulsed, coded or modulated) signal from the cleaner over the two-wire cable 50. Referring to the circuit embodiment of FIG. 6, during the time that the capacitor C4 discharges so that current flows to the input of the second inverter 316B2, the transistor T4 closes and then opens. The closing and opening of transistor T4 causes the Zener diode Z4 to provide a low voltage at node 325B and turn off transistor TP2, and then the Zener diode Z4 provides a high state at node 325B, which turns transistor TP2 back on. When transistor TP2 is off, the power interruption occurs because current cannot flow from the motor 102 to the second conductor 304. Thus, the turning off and on of transistor TP2 generates the pulsed power signal over the two-wire cable 50.

Referring again to FIGS. 9A and 9B, the power reduction (i.e., a voltage or current drop occurring on one of the conductors of the cable 50) occurring at time t1 until t2 is detected as a pulsed signal by power monitoring circuitry (e.g., current detection circuitry) installed in the power supply 40. The duration of the pulse is dependent on the timer (e.g., RC) circuitry 322, as described above. The microcontroller 200 of the power supply 40 includes programming and/or circuitry that interprets the pulse at transistor T4 as being caused by the tilt sensor circuitry 300, and the method proceeds to step 512.

At step 512, the power supply 40 will continue to provide power with the same polarity to the cleaner 100 for a predetermined time period so that the cleaner 100 can ascend the sidewall 14 of the pool 10. The method 600 then proceeds to step 514, where in one embodiment, the power supply monitors and determines if the predetermined time period has lapsed. If not, the method goes to step 512, where the same power polarity is provided to the cleaner. Otherwise, if the predetermined time period has lapsed, the method 500 proceeds to step 516.

At step 516, the power supply 40 reverses the polarity of the electric power sent to the cleaner 100 via the two-wire cable 50. Referring to FIGS. 9A and 9B, at time t3, the predetermined time period has lapsed and the cleaner has ascended the sidewall 14 of the pool 10. Thereafter, the power supply 40 reverses polarity to the cleaner via the two wire cable 50 and the cleaner descends from the sidewall 14 to the bottom surface and moves along the bottom 12 to an opposing sidewall where it begins to climb the opposing sidewall 14. At time t4, the first tilt sensor 308A is activated and the driver transistor T1 is open so that the input of the first inverter 316A1 is high and its output is low. During the time period t4 through t5, the capacitor C2 discharges its current so that the transistor T2 closes and opens in a similar manner as described above with respect to the operation of capacitor C4 and transistor T4. The power supply detects the closing and opening of transistor T2 caused by the pulse generated by the tilt sensor circuitry 300 and interprets the pulsed signal as signifying the cleaner is climbing a sidewall of the pool.

The Zener diode Z2 provides a high potential at node 325A so that the gate of power transistor TP2 is biased. The current from the second conductor 304 flows through the internal diode D2 of transistor TP2 to the motor 102, and through the drain and source of transistor TP1 to return to the power supply 40 via the first conductor 302. The cleaning pattern is repeated each time the cleaner 100 ascends a sidewall 14 of the pool 10 and one of the capacitors C3 or C4 discharges current. The time delay by the capacitor to discharge the current thereby provides a signal to the power supply 40 to indicate the cleaner's position as it begins to ascend the sidewall of the pool.

At step 518, if the cleaning operation has not terminated, the process of the cleaner 100 moving along the bottom of the pool, climbing the sidewall of the pool, providing a pulsed signal to the power supply 50, and reversing the polarity of power to the cleaner motor 102 after a predetermined time period is repeated until the cleaning operation is terminated. Once the cleaning operation is terminated, at step 599, the method 500 ends.

Referring now to FIG. 7, a second illustrative embodiment of a circuit 400 for providing a signal when the cleaner 100 begins ascending a sidewall 14 of the pool 10 is shown. The circuit 400 is similar to the circuit 300 of FIG. 6 except that a single voltage regulator 404 and tilt sensor 308 are utilized. In particular, the first conductor 302 and the second conductor 304 of the cable 50 are connected to the motor 102 via the circuit 400. The circuit 400 comprises a diode bridge 402, a voltage regulator 404, a tilt sensor 308, a trigger circuit 408, a first power transistor TP1 with biasing circuitry and a second power transistor TP2 with biasing circuitry.

The diode bridge 402 has first and second inputs that are coupled between the first and second conductors 302 and 304, and first and second outputs that provide a low potential (e.g., ground) and a high rectified potential VM. For example, if the input voltage is 30 VDC, then the rectified potential will be approximately 29 V (30V minus the drops across the diodes internal to the diode bridge which are typically around 1V).

The diode bridge 402 rectifies the input signal and enables the polarity at the outputs (Ground and VM) to remain the same polarity regardless of the polarity changes (reversals) at the inputs (i.e., first and second conductors 302 and 304). The output VM of the diode bridge 402 is connected to the input of the voltage regulator 404. The voltage regulator 404 can be a single integrated voltage/current regulator such as a LM2936 current/voltage regulator manufactured by TEXAS INSTRUMENTS, although such device is not considered limiting. For example, other voltage regulators that can be implemented can include an L7805, LM317 and the like which are capable of providing a DC voltage output VCC that is suitable for driving the logic devices of the present circuit 400.

The tilt sensor 308 can be the same as the tilt sensors or accelerometers discussed with respect to circuit 300 of FIG. 6 (e.g., an RPI-1031 tilt sensor), although the specific tilt sensor is not to be considered limiting. The anode connection AN of the internal light emitting diode is connected to the output voltage VCC of the voltage regulator 404 via a current limiting resistor R1, and the cathode CATH of the internal LED is connected to ground (i.e., the second conductor 304). The emitters E1 and E2 of the first and second internal transistors of the tilt sensor 308 are also connected to ground. The first and second cathodes C01 and C02 of the respective first and second internal transistors of the tilt sensor 308 are connected to VCC via current limiting resistor R2, as well as to the input of a first non-inverting gate 416A. The output of first non-inverting gate 416A is coupled to the input of a second non-inverting gate 416B via a timer (e.g., RC) circuit 322. The non-inverting gates 416 are preferably Schmidt triggers, although such device is not considered limiting as any logic gate or device that can produce the same logic state at its output as applied to the input can be implemented.

The timer delay circuit is illustratively formed by an RC circuit 322 having a capacitor C2 connected from the output of the first gate 416A to the input of the second gate 416B, and a resistor R3 connected from VCC to the input of the second gate 416B. Light emitting diodes (LEDs) 410A and 410B each have its respective cathode connected to the output of the second Schmidt trigger 416B. Each anode of the LEDs 410A and 410B is connected to VCC respectively through current limiting resistors R4 and R5. The LED 410A is paired with a light activated diode 412A which has its emitter coupled to the first conductor 302 and its cathode connected at node 425A to the gate of a first power transistor TP1. The source/bulk of the power transistor TP1 is connected to the first conductor 302 and its drain is connected to the motor 102 (e.g., the commutator). A first Zener diode Z1 has its anode connected to the first conductor 302 and its cathode connected at node 425A to the gate of the transistor TP1, as well as to the second conductor 304 via a current limiting resistor R6.

Similarly, LED 410B is paired with a light activated diode 412B which has its emitter coupled to the second conductor 304 and its cathode connected at node 425B to the gate of a second power transistor TP2. The source/bulk of the power transistor TP2 is connected to the second conductor 304 and its drain is connected to the motor 102 (e.g., the commutator). A second Zener diode Z2 has its anode connected to the second conductor 304 and its cathode connected at node 425B to the gate of the transistor TP2, as well as to the first conductor 302 via a current limiting resistor R7.

During normal operation when the cleaner is moving along the substantially horizontal planar bottom surface of the pool, one of the conductors, e.g., the first conductor Vin1 302 is illustratively at a positive DC potential, e.g., 30 VDC, and the second conductor Vin2 304 is at a lower potential, e.g., ground. For purposes of describing the invention, the first conductor 302 is illustratively at a high voltage (e.g., 30 VDC) and the second conductor 304 is at ground potential. The diode bridge provides consistent positive and negative output voltages (e.g., VM and GND) regardless of the polarity over the two-line cable 50. The output signal VM is provided to the input pin Vin of the voltage regulator 404, which in turn provides a constant output voltage VCC (e.g., 5 VDC) that is sufficient to drive the logic gates of the tilt sensor 308 and the trigger circuitry 408.

When the cleaner is moving along the bottom surface, the tilt sensor 308 is off. Specifically, the internal transistors do not conduct because the light from the internal LED is prevented (blocked) from illuminating and biasing the bases/ of the internal transistors. Thus, the internal transistors act as open circuits and the non-inverting gate 416A is pulled high by resistor R2. The non-inverted output of gate 416A charges capacitor C2 and the input and output of the second gate 416B becomes high, which means that the photo-couplers formed by the LEDs 410 and corresponding light activated transistors 412 are also off. In the present example, current from the first conductor 302 flows through the internal diode of the power transistor TP1 to the motor 102, and through the drain and source of the second power transistor TP2 to the second conductor (e.g., ground) 304. A person of ordinary skill in the art will appreciate that when the polarity is reversed during normal operations (movement along the bottom surface of the pool) where the first conductor 302 is at a low or ground potential and the second conductor 304 is at a high potential, the tilt switch 308, LED 410 and transistors 412 are still turned off and the current from the second conductor 304 flows through the internal diode of the power second transistor TP2 to the motor 102, and through the drain and source of the first power transistor TP2 to the first conductor (e.g., ground) 302.

When the cleaner is climbing the wall, the tilt sensor is activated as the leading edge of the cleaner is raised at a predetermined angle (e.g., 30-60 degrees) with respect to the bottom surface 12 of the pool 10. When the tilt sensor 308 is activated its internal LED illuminates and forward biases its internal transistors, which conduct and pull the inputs and outputs of the first and second non-inverting gates 416A and 416B to ground. Because the input of the second non-inverter gate 416B will go to a low state, the RC circuit 322, which is formed by the previously charged capacitor C2 and resistor R3, will discharge current at the input of the second non-inverter gate 416B2 over a predetermined time period. The current discharge from capacitor C2 causes the second non-inverter 416B to go from a low state to a high state, which turns both of the opto-couplers 410 and 412 to turn off. That is, the LEDs 410A and 410B stop illuminating and biasing the corresponding light activated transistors 412A and 412B.

While the capacitor C2 is discharging, current from the first conductor 302 flows through the internal diode D1 of the first power transistor TP1 and to the commutator of the motor 102, since the transistor 412A is reversed biased with respect to its gate. As well, the second Zener diode Z2 provides a high voltage potential at node 425B to forward bias the gate of the second power transistor TP2, which allows the current from the motor to flow through the drain and source of TP2 to the second conductor 304, as described above.

When the polarity to the motor is reversed under normal horizontal cleaning operations, current from the second conductor 304 flows through the internal diode D2 of the second power transistor TP2 and to the commutator of the motor 102, since the transistor 412B is reversed biased with respect to its gate. As well, the first Zener diode Z1 provides a high voltage potential at node 425A to forward bias the gate of the first power transistor TP1, which allows the current from the motor to flow through the drain and source of the first transistor TP1 to the second conductor 304.

Referring again to FIGS. 8A and 8B, the method 500 for sending a pulsed signal from a pool cleaner having the tilt sensor circuit 400 to the power supply 40 via the two-wire power cable 50 is illustratively shown. FIGS. 8A and 8B should be viewed in conjunction with FIGS. 7, 9A and 9B. The method 500 starts at step 501 and proceeds to step 502, where the cleaner is performing a cleaning operation on a bottom surface 12 of the pool 10. Referring to FIG. 9A, during operation when the cleaner 100 is on the bottom 12 or substantially planar surface of the pool 10, the tilt sensor 308 is off. Continuing with the polarity arrangement described above with respect to FIG. 7 (Vin1 302 is positive and Vin2 304 is negative), at step 504, the cleaner reaches and initiates the climbing a sidewall 14 of the pool 10.

Referring collectively to FIGS. 9A and 9B from left to right, at time zero to time t1, the cleaner 100 is moving substantially horizontal along the bottom surface 12 of the pool 10 and DC power from the power supply 40 over the two-wire cable 50 is constant until just prior to time t1, in which the cleaner reaches and begins to climb a sidewall 14 of the pool 10. During times t0 to t1, the tilt sensor 308 is off, the non-inverting gates 416 are high, the LEDs 410 are off, and current from the first conductor 302 flows through the internal diode D1 of the first power transistor TP1, through the motor 102, through the drain and source of the second power transistor TP2, and through the second conductor 304 of the power cable 50.

At step 506, the leading edge of the cleaner 100 ascends a predetermined angle with respect to the bottom surface 12 to activate the tilt sensor 308 and the circuit 400 generates a pulsed power signal over the two-wire cable 50. In particular, referring to FIGS. 9A and 9B, at time t1 the cleaner 100 climbs to a predetermined angle with respect to the bottom surface 12 of the pool and the tilt sensor 308 turns on as described above. Referring to FIG. 7, when the tilt sensor 308 is activated, the inputs and outputs of the first and second non-inverter gates 416A and 416B go to low states. At time t1, the timer delay (e.g., RC) circuit 322 discharges current to the input of the second non-inverter 416B, which causes its output to go high and briefly turn off the LEDs 410A and 410B. The capacitor discharge time is characterized by the voltage/current drop (i.e., a pulse) shown between times t1 and t2. Although the pulse is illustratively shown as being a vertical drop in power, one of ordinary skill in the art will appreciate that where the timer is formed by an RC circuit, the discharge is actually an exponential decay based on the RC time constant as described above with respect to the circuit 300 of FIG. 6.

At step 508, constant electrical power is provided to the electrical pump and/or drive motor of the cleaner after the capacitor C2 has discharged. Once the capacitor C2 has discharged its current, the non-inverting gates 416 return to a low state and the LEDs 410 conduct. In particular, the opto-couplers 410 and 412 are turned off and power to the motor 102 is provided from the first conductor 302 through the internal diode D1 of power transistor TP1, through the motor commutator, through the drain and source of transistor TP2, and back to the power supply 40 via the second conductor 304.

At step 510, the power supply 40 senses the pulsed signal from the cleaner over the two-wire cable 50. Referring now to FIGS. 7 and 9A and 9B, during the time that the capacitor C2 discharges current to the input of the second non-inverting gate 416B, the opto-couplers, i.e., the LEDs 410 and their complementary transistors 412 close and then open. The closing and opening of the opto-couplers 410 and 412 causes the Zener diode Z2 to go to a low at node 425B which turns off transistor TP2, and switch back to a high state at node 425B which turns transistor TP2 back on. When the transistor TP2 is off, current cannot flow from the motor 102 to the second conductor 304. Thus, the turning off and on of transistor TP2 generates the pulsed power signal that occurs on the cable 50. Referring again to FIGS. 9A and 9B, the power reduction (i.e., a voltage or current drop occurring on one of the conductors of the cable 50) occurring during the time period of t1 to t2 is detected as a pulse by power monitoring circuitry (e.g., current detection circuitry) installed in the power supply 40. The duration of the pulse is dependent on the RC circuitry 322, as described above. The microcontroller 200 of the power supply 40 includes software and/or circuitry for interpreting the pulse occurring at transistor TP2 as being caused by the tilt sensor circuitry 400, and the method proceeds to step 512.

At step 512, the microcontroller 200 of the power supply 40 interprets the voltage/current reduction as being caused by the tilt sensor 308 and the power supply 40 will continue to provide power with the same polarity to the cleaner 100 for a predetermined time period so that the cleaner 100 can continue to ascend the sidewall 14 of the pool 10. The method 600 then proceeds to step 514, where the power supply monitors and determines if the predetermined time period has lapsed. If not, the method 500 proceeds to step 512, where the same power polarity is provided to the cleaner 100. Otherwise, if the predetermined time period has lapsed, the method 500 proceeds to step 516. At step 516, the power supply 40 reverses the polarity of the electric power sent to the cleaner 100 via the two-wire cable 50. Referring to FIGS. 9A and 9B, at time t3, the predetermined time period has lapsed and the cleaner has ascended the sidewall 14 of the pool.

At step 516, the power supply 40 reverses polarity to the cleaner via the two wire cable 50 and the cleaner descends from the sidewall 14 to the bottom surface and moves along the bottom 12 to an opposing sidewall where circuit 400 it begins to climb the opposing sidewall 14. At time t4, the tilt sensor 308 is again activated and the non-inverting logic gates 416 go to a low state. At time t4 through t5, the capacitor C2 discharges its current so that the LEDs 410 are again turned off and another pulse is detected by the power supply 40.

At step 518, if the cleaning operation has not terminated, the process of the cleaner 100 moving along the bottom of the pool, climbing the sidewall of the pool, providing a pulsed signal to the power supply 540, and reversing the polarity of power to the cleaner motor 102 after a predetermined time period is repeated until the cleaning operation is terminated. Once the cleaning operation is terminated, at step 599, the method 500 ends.

The pool cleaner 100 can be any robotic pool cleaner having a housing including a base and cover, rotatatably mounted supports (e.g., wheels, tracks, rollers, brushes, and the like), and an electric motor 102 for moving the cleaner along the surface to be cleaned and/or contributing to the filtering process of the water. For example, the present invention is suitable for implementation in a self-propelled robotic cleaner having an electric water pump and a flap valve for discharging opposing streams of filtered water to propel the cleaner in a forward or reverse direction, such as shown and described in commonly assigned U.S. Pat. No. 7,165,284, the content of which is incorporated by reference in its entirety. Other cleaners suitable for implementation of the present invention are shown and described in commonly assigned U.S. Pat. No. 9,062,473 (horizontally mounted electric motor with opposing dual propellers for propelling and providing filtering capabilities for the cleaner), and U.S. application Ser. No. 13/719,633 which describes a track driven robotic cleaner with one or more electric motors to provide power to the water pump and drive the wheels of tracks, the content of which are incorporated by reference in its entirety.

One of ordinary skill in the art will appreciate that the components on the orientation sensor circuitry embodiments 60, 300 and 400 can be mounted on a printed circuit board (PCB). In an alternative embodiment, the orientation sensor circuitry 60, 300 and 400 can be formed as an application-specific integrated circuit (ASIC). The tilt sensor circuit is preferably installed in the interior of the electric motor housing which is sealed to prevent exposure to water (i.e., waterproof). Alternatively, the tilt sensor circuit can be mounted in a sealed housing and located at another location within the interior chamber formed by the housing of the cleaner.

Figure 10:
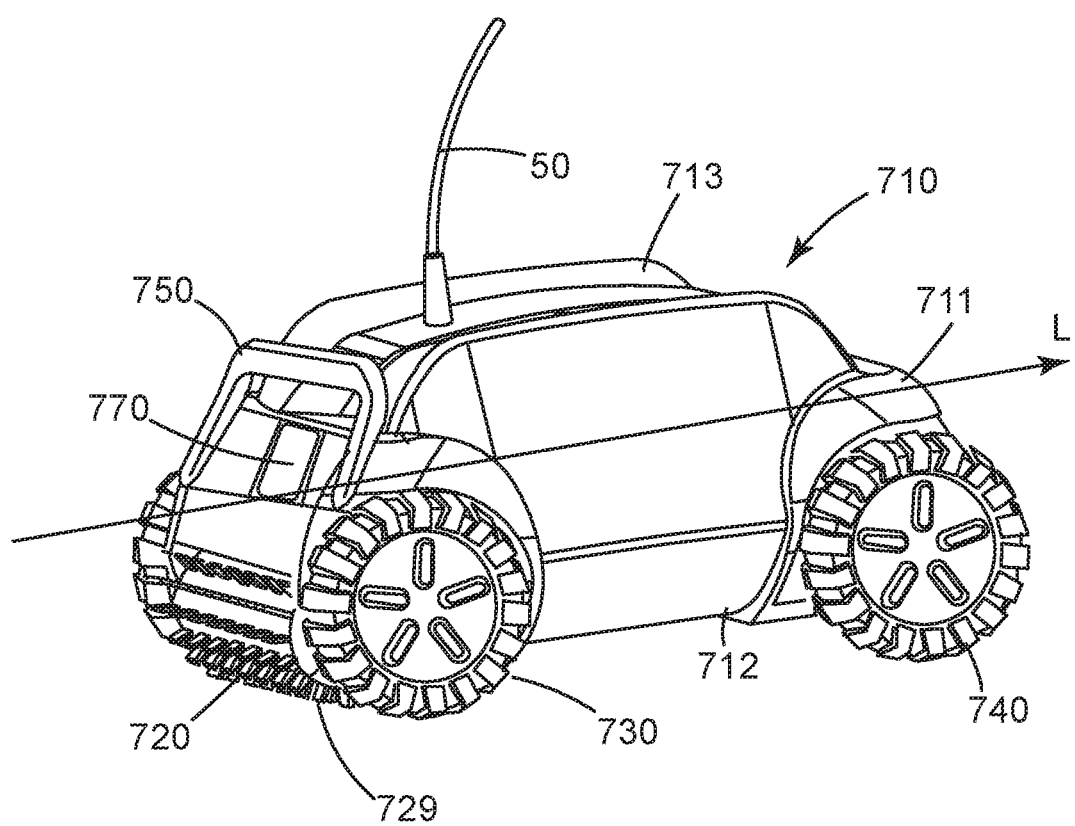
FIG. 10 is a perspective view of a self-propelled robotic pool cleaner suitable for implementing the present invention.
Figure 11:
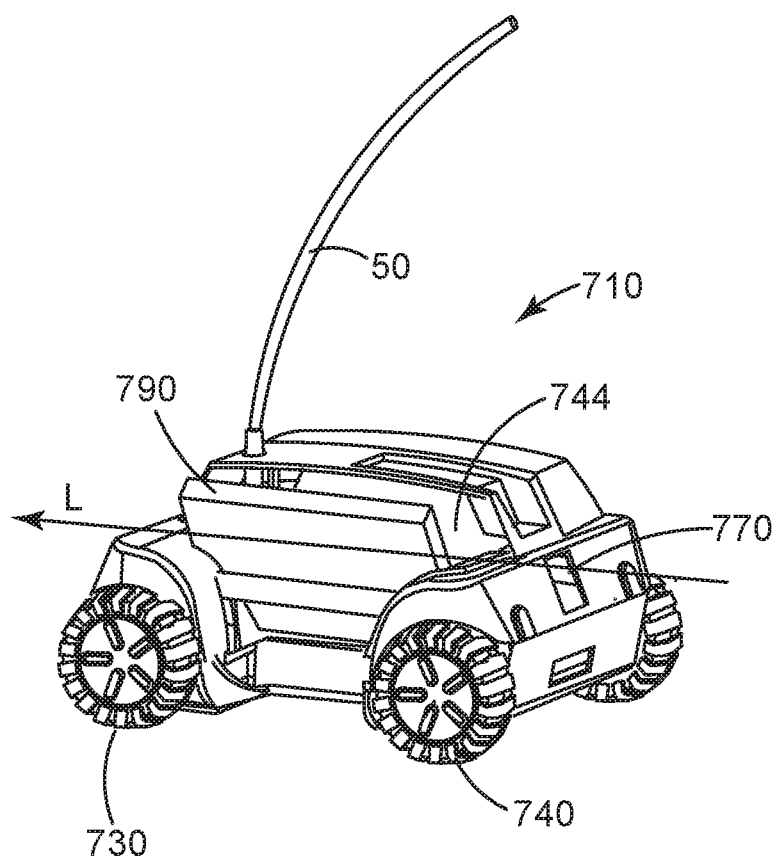
FIG. 11 is a perspective view of the pool cleaner of FIG. 10.
Figure 12:
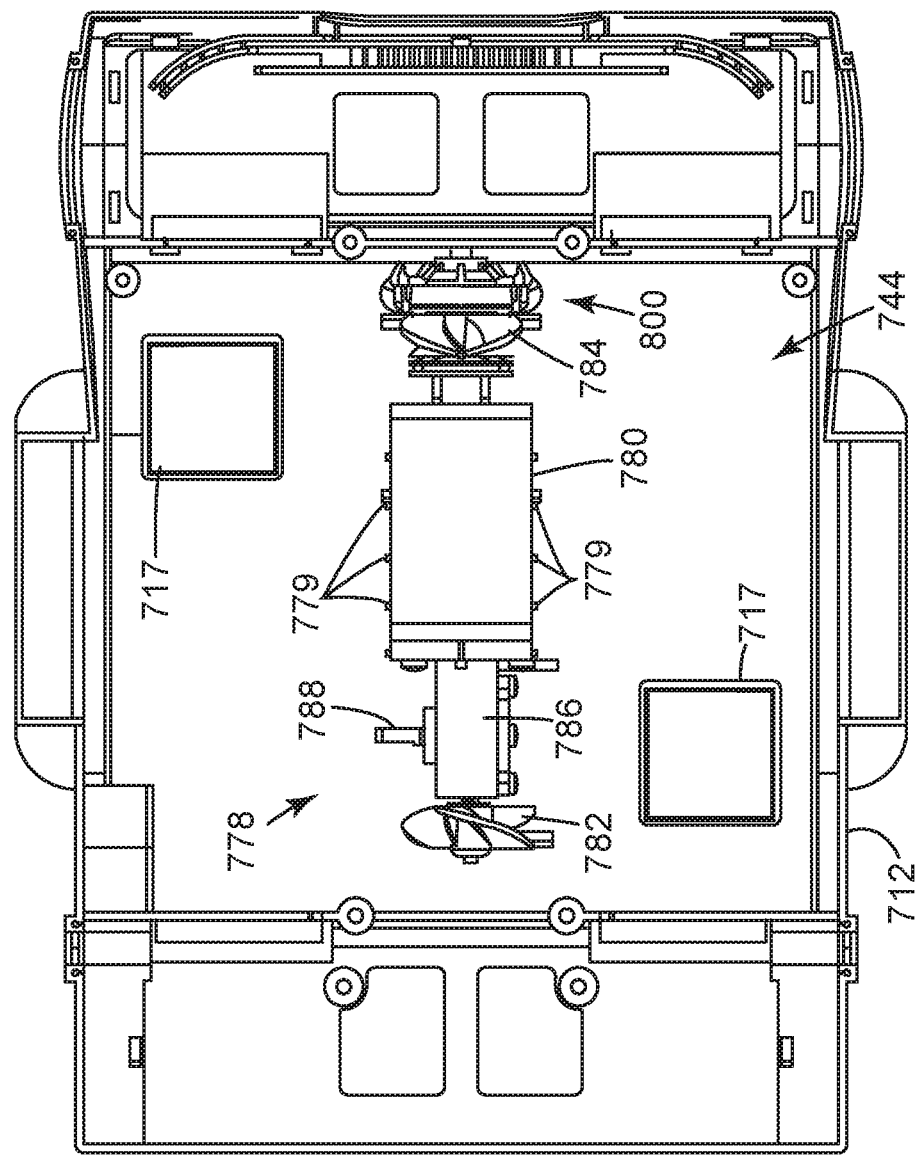
FIG. 12 is a bottom view of the dual propeller motor and a brush assembly of the cleaner of FIG. 10.

Referring to FIGS. 10-12, an illustrative example of a self-propelled robotic pool cleaner 710 that is suitable for implementing the method and system of the present invention is shown. Referring to FIGS. 10 and 11, the pool cleaner 710 includes a housing 711 having a bottom portion or base 712 and an upper portion which can form a cover 713 above the base 712. The base 712 and upper portion and/or cover 713 collectively define an interior chamber 744 in which a propulsion drive motor assembly 778 (FIG. 12), a filter 790 (FIG. 11), the power wash assembly 800 (FIG. 12), and other cleaner assemblies and components are housed. The cleaner 710 is generally configured to be essentially neutrally buoyant when submerged in the water.

Referring now to FIG. 12, the cleaner 710 includes at least one water inlet port 717 formed in the base 712. The cleaner also includes a discharge conduit or port 770 that is formed in the upper portion of the housing 711 and which can be directed normally or at an acute angle to the surface beneath the cleaner. Since the cleaner is generally neutrally buoyant, the downward thrust or vector from a water jet being discharged from the discharge port 770 helps to stabilize and maintain the cleaner 10 on the surface being cleaned. As illustratively shown in FIGS. 10 and 11, a discharge conduit or port 770 is provided at the opposing ends (front and rear) and preferably centrally positioned generally in alignment with the longitudinal axis "L" of the cleaner 710.

The robotic pool cleaner 710 illustratively is shown equipped with rotationally-mounted supports which are coupled to the housing 711 for moving and guiding the cleaner 710 over the submerged surface of the swimming pool or tank. The rotationally-mounted supports are illustratively, wheels 730 and 740 mounted on axles. A person of ordinary skill in the art will appreciate that the wheels 730, 740 are not to be considered limiting and are disclosed herein for illustrative purposes only. For example, the rotationally-mounted supports can be, or include one or more of tracks, rollers, caster wheels and the like. A detailed description of an endless track driven robotic cleaner is provided in U.S. application Ser. No. 13/719,633, the disclosure of which is incorporated by reference herein in its entirety.

Referring now to FIGS. 11 and 12, the cleaner 710 is illustratively shown as being propelled by a dual propeller electric motor assembly 778 that produces a jet of filtered water that is discharged through a water jet discharge conduit or port 770 (FIGS. 10 and 11) formed in the housing 711. The dual propeller motor eliminates the need for additional drive motors and/or gear trains as is commonly implemented in the prior art to directly engage and rotate one or more of the supporting wheels or tracks.

Control means (not shown) can be provided to steer and/or periodically reverse the direction of movement while performing a cleaning program, as well as to assure that the cleaner does not become immobilized, e.g., by an obstacle in the pool. If, for example, the pool cleaner does not change its orientation with respect to the bottom or sidewall as indicated by a signal from an on-board sensor (e.g., mercury switch) indicating that such transition has occurred during the prescribed period (e.g., two minutes), a control circuit will automatically reverse the polarity of the electric motor 780 to change the direction of movement in order to permit the cleaner to move away from the obstacle and resume its prescribed scanning pattern. Sensors, such as magnetic and infrared-responsive signaling devices can also be provided to change the direction of movement in response to prescribed conditions, e.g., absence of forward movement due to an obstacle. In addition, the control means can automatically steer the cleaner to the right or left while moving in either the forward or reverse direction.

Referring to FIG. 11, the cleaner 710 includes a filter assembly 790 that is mounted within the interior chamber 744 over the water inlet ports 717 of the base 712. For example, the filter assembly can be a filter basket having a mesh screen, a filter bag, a filter canister, a perforated or mesh screen or any other filtering device known in the art.

In particular, the filter is positioned over the water inlet ports 717 such that water and debris from beneath the cleaner that is drawn into the interior chamber is captured by the filter and the debris cannot escape. A cover, check valve or flap valve can be provided over each water inlet port 717 to prevent reverse flow of the debris back into the pool when the cleaner is powered down. The water and debris that is drawn into the cleaner via the inlet port 717 is filtered, i.e., the debris is retained by the filter assembly 790, and the clean water that passes through the filter medium is discharged back into the pool through the one or more discharge ports 770.

As shown in FIGS. 10 and 11, the discharge conduit/port 770 is provided on the front and rear ends of the cleaner 710 and, preferably, the discharge conduits 770 are angled with respect to the surface below the cleaner. Referring to FIG. 10, when the filtered water is discharged through the discharge port 770 in the form of a pressurized water jet, the cleaner will move forward in the opposite direction to the right. Similarly, referring to FIG. 11, when the filtered water is discharged through the discharge port 770 at the opposite end in the form of a pressurized water jet, the cleaner will move forward in the opposite direction. Thus, the filtered water jet produces a drive motive force for moving the cleaner. As well, the "front" and "rear" portions/ends of the cleaner 710 alternate back and forth based on the forward direction of movement of the cleaner. As shown in the drawings, the water jet discharged from the discharge port 770 is at an angle "a" to the translational plane of movement of the cleaner 710 and produces a force vector component in a downward direction towards the leading end, e.g., the wheels, as well as a translational force vector tending to move the cleaner across the surface being cleaned. The orientation of the discharged water jet can be varied to provide a downward component or force vector, lateral components, or a combination of such components or force vectors to complement the translational force. The implementation of a water jet drive system and method for moving the cleaner is disclosed in U.S. Pat. Nos. 6,412,133 and 9,062,473, the contents of which are incorporated by reference herein in their entireties.

Referring again to FIGS. 11 and 12, a water pump assembly 778 is secured to a mounting structure 779 formed in the interior chamber 744 of the cleaner 710. The water pump assembly 778 illustratively includes an electric motor 780, a drive shaft, a first propeller 782 and a second propeller 784, in which the first and second propellers are mounted on opposing ends of the drive shaft. The electric motor 780 receives power from the remote power supply via the electric cable 50. Rotation of at least one of the propellers 782, 784 causes the filtered water from the interior chamber 744 to flow through an adjacent discharge port 770. The discharged filtered water creates a low water pressure environment within the interior chamber 744, which in turn induces water and debris from beneath the cleaner (which is at a higher pressure) to be drawn into the water inlet port 717 for filtering by the filter assembly and subsequent discharge through the discharge conduits 770.

Although the water pump is described as being a horizontally mounted dual propeller pump, such configuration is not limiting for purposes of the present invention. That is, a person of ordinary skill in the art will appreciate that other water pump assembly configurations may be implemented to practice the invention. For example, the water pump assembly can include a pair of water pumps with each pump having a propeller mounted to corresponding electric motor, a single propeller motor mounted horizontally, vertically or at an angle there between, and the like. A detailed description of a horizontally mounted water pump assembly is provided in commonly assigned U.S. Pat. No. 9,062,473, which includes a horizontally mounted electric motor with opposing dual propellers for propelling and providing filtering capabilities for the cleaner. Additionally, a detailed description of a self-propelled robotic cleaner having a flap valve for alternatively discharging opposing streams of filtered water to propel the cleaner in a forward or reverse direction is disclosed in commonly assigned U.S. Pat. No. 7,165,284, the disclosure of which is incorporated by reference in its entirety.

Referring to FIGS. 10 and 12, the water pump assembly 778 can also be used to rotate a roller brush 720 of a brush assembly which is positioned along the bottom of the base 712 to scrub the pool surface beneath the cleaner 710. As illustratively shown in FIG. 12, the brush assembly comprises a roller brush 720 having a plurality of bristles or protruding members 729.

The electric motor 780 includes a gear box 786 which translates the rotation of the electric motor 780 by 90° or some other angle and also reduces the number of rotations at a predetermined ratio. The gear box 786 has a takeoff spindle 788 which transmits a rotational force to a gear train or preferably a drive belt system (not shown) to rotate the brush assembly. A detailed description of a suitable brush assembly is disclosed in commonly assigned U.S. application Ser. No. 13/681,899, the disclosure of which is incorporated herein by reference in its entirety. One of ordinary skill in the art will appreciate that the brush assembly is not to be considered limiting and is described herein for illustrative purposes only.

While the foregoing is directed to various embodiments of the present invention, other and further embodiments and advantages of the invention will be apparent to those of ordinary skill in the art from this description and without departing from the scope of the invention, which is to be determined by the claims that follow.

What is claimed is:

1. A method for cleaning a surface of a pool with a robotic pool cleaner having an electric motor for moving the cleaner, the cleaner being electrically connected to a remotely located power supply via a two-wire electrical power cable for providing power to the electric motor, the method comprising the steps of:
- receiving, at the electric motor, electrical power with a first polarity from the remote power supply via the two-wire electrical power cable;
- performing a cleaning operation on a surface of the pool;
- causing movement of the cleaner with respect to a surface of the pool thereunder;
- providing an electrical signal from the cleaner to the remote power supply over the two-wire electrical power cable when the cleaner moves with respect to the surface of the pool as detected via a sensor mounted in or on the cleaner;
- again receiving electrical power with the first polarity over the two-wire electrical power cable after the electrical signal is provided back to the remote power supply; and
- receiving electrical power with reversed polarity over the two-wire electrical power cable after the electrical signal is provided back to the remote power supply and before again receiving electrical power with the first polarity over the two-wire electrical power cable.

2. The method of claim 1, wherein the performing a cleaning operation step comprises the steps of:
- drawing water and debris into the cleaner via at least one inlet;
- filtering and retaining the debris in a filter assembly; and
- discharging the filtered water back into the pool.

3. The method of claim 1, wherein the step of providing the electrical signal comprises providing a pulsed signal to the remote power supply over the two-wire electrical power cable.

4. The method of claim 1, wherein the step of providing the electrical signal comprises providing a coded signal to the remote power supply over the two-wire electrical power cable.

5. The method of claim 1, wherein the step of providing the electrical signal comprises providing a modulated signal to the remote power supply over the two-wire electrical power cable.

6. The method of claim 1, wherein the providing the electrical signal step further includes interrupting power to the electric motor for a predetermined time via a timer delay circuit coupled to an output of the orientation sensor.

7. The method of claim 1 further comprising the step of causing the cleaner to climb a side wall of the pool.

8. A method for cleaning a surface of a pool with a robotic pool cleaner having an electric motor for moving the cleaner, the cleaner being electrically connected to a remotely located power supply via a two-wire electrical power cable for providing power to the electric motor, the method comprising the steps of:
- receiving, at the electric motor, electrical power with a first polarity from the remote power supply via the two-wire electrical power cable;
- performing a cleaning operation on a surface of the pool;
- causing movement of the cleaner with respect to a surface of the pool thereunder;
- providing an electrical signal from the cleaner to the remote power supply over the two-wire electrical power cable when the cleaner moves with respect to the surface of the pool as detected via a sensor mounted in or on the cleaner;
- again receiving electrical power with the first polarity over the two-wire electrical power cable after the electrical signal is provided back to the remote power supply; and
- receiving electrical power reversed polarity over the two-wire electrical power cable after a predetermined time period lapses, and reversing a direction of movement of the cleaner.

9. The method of claim 1 further comprising the step of detecting, at the remote power supply, the electrical signal over the two-wire electrical power cable.

10. The method of claim 1 in which the sensor is an orientation sensor and the step of causing movement of the cleaner with respect to a surface of the pool thereunder comprises changing orientation of the cleaner with respect to the surface of the pool thereunder.

* * * * *